United States Patent [19]

Furukawa et al.

[11] Patent Number: 6,002,657
[45] Date of Patent: Dec. 14, 1999

[54] APPARATUS FOR READING IDENTIFICATION INDICATION PROVIDED ON AN OPTICAL DISC AND METHOD THEREFOR

[76] Inventors: Ken'ichi Furukawa, c/o Mitsumi Electric Co., Ltd. of 8-8-2, Kokuryo-cho, Chofu-shi, Tokyo; Takayuki Igarashi, c/o Newtronics Co., Ltd. of 1-1, Bandai, Tendo-shi, Yamagata, both of Japan

[21] Appl. No.: 08/939,248

[22] Filed: Sep. 29, 1997

[30] Foreign Application Priority Data

Sep. 30, 1996 [JP] Japan .................................. 8-278868

[51] Int. Cl.[6] ........................................................ G11B 7/00
[52] U.S. Cl. ............................................................... 369/58
[58] Field of Search .................................. 369/58, 275.1, 369/275.3, 32, 56, 53

[56] References Cited

U.S. PATENT DOCUMENTS

| | | |
|---|---|---|
| 3,752,961 | 8/1973 | Torrey . |
| 4,677,604 | 6/1987 | Selby, III et al. . |
| 4,983,815 | 1/1991 | Kumasaka . |
| 5,345,435 | 9/1994 | Yamasaki .............................. 369/275.1 |
| 5,430,281 | 7/1995 | Lentz et al. . |
| 5,807,640 | 8/1995 | Ueno et al. .......................... 369/275.1 |
| 5,822,291 | 11/1995 | Brindze et al. ....................... 369/275.1 |

FOREIGN PATENT DOCUMENTS

| | | |
|---|---|---|
| 0 329 122 A2 | 8/1989 | European Pat. Off. . |
| 0 549 488 A1 | 6/1993 | European Pat. Off. . |
| 7-182659 | 7/1995 | Japan . |

*Primary Examiner*—Nabil Hindi
*Attorney, Agent, or Firm*—Patents & Tms, P.C.; Brian Mattson

[57] ABSTRACT

An apparatus for reading an identification indication such as a bar code provided on an optical disk is provided. The bar code is provided in at least a part of an annular-shaped bar code area formed between a program area and a clamping area of the optical disc, and the bar code represents predetermined information and has a reading end representation at the rear portion of the bar code in the rotational direction of the optical disc. The apparatus comprises a detector for optically acquiring the information of the bar code and a discriminating section for discriminating based on the output from the detector as to whether the bar code is accurately read. The discriminating section includes a first determining section for determining based on the output from the detector as to whether the data acquired by the detector contains data of the reading end representation or an equivalent thereof; and a second determining section for determining based on the result of the determination of the first determining section as to whether or not the data acquired by the detector reaches a predetermined amount of data of the bar code. The discriminating section discriminates that the bar code is accurately read in the case where the first determining section determines that the data acquired by the detector contains data of the reading end representation or an equivalent thereof, and the second determining section determines that the data acquired by the detector reaches the predetermined amount of data of the bar code.

18 Claims, 17 Drawing Sheets

APPARATUS FOR READING IDENTIFICATION INDICATION PROVIDED ON AN OPTICAL DISC AND METHOD THEREFOR

BACKGROUND OF THE INVENTION

1. Field of the Invention

The present invention relates to an identification indication reading apparatus for reading an identification indication such as a bar code provided on an optical disc and a method therefor.

2. Description of the Prior Art

There are known optical discs which are provided with an identification indication such as a bar code or the like to identify various information. For example, in the case of an optical disc 3 such as a photo CD developed by Kodak, Inc., as shown in FIG. 1, an arc-shaped bar code 3d is provided on an annular bar code area 3c formed between a clamping area 3b and a program area 3e of the optical disc 3. With this bar code 3d, various information such as the disc manufacturer and the date of manufacturing is specified, thereby enabling to determine the type of disc, the disc format and the like. In order to read the bar code of an optical disc such as the photo CD, a photo-interrupter for reading bar code information must be provided in addition to an optical pick-up for reading data recorded in the program area 3e of the optical disc.

In this connection, FIG. 2 shows an example of a disc drive which includes such a photo-interrupter (Japanese Laid-Open Patent Application HEI 7-182659). As shown in this drawing, in this disc drive a photo-interrupter 9a is mounted on a sensor platform 9 which is provided in the vicinity of a turntable 8. Thus, by means of the photo-interrupter 9a, the bar code of the loaded optical disc is read out from the lower side of the optical disc. In this way, in the disc drives of the prior art, the photo-interrupter 9a is positioned underneath the optical disc, namely, the photo-interrupter 9a is positioned at the side where the optical pick-up and the turntable 8 are provided, and the bar code is read from underneath the loaded optical disc.

In the meantime, a disc drive having an identification indication reading apparatus is proposed in Japanese patent application filed by the present inventor on Sep. 26, 1997 (Japanese Patent Application No. HEI 8-275469)). In the disc drive, a photo-interrupter is mounted on a disc clamper supporting member to read a bar code provide on an optical disc from the upper side of the loaded optical disc.

However, because letters, marks, patterns and the like are printed on the upper surface of the optical disc, when the bar code provided on the optical disc is read from the upper side of the optical disc, such letters, marks, patterns and the like are liable to become a source of noise. Further, scratches, dust or the like on the upper surface of the disc are also likely to become a source of noise. In this connection, this problem of noise caused by scratches, dust or the like is not limited to the case where the bar code of the optical disc is being read from the upper side of the optical disc. Such a problem also occurs in the case where the bar code of the optical disc is read from the underside of the optical disc. When this kind of noise occurs, there is a case where such noise is confused with a signal from the bar code, thereby making it impossible to accurately read the bar code of the optical disc.

SUMMARY OF THE INVENTION

The present invention has been made in view of the problem involved in the prior art apparatus described above. Accordingly, the object of the present invention is to provide an apparatus for reading an identification indication which can accurately read out an identification indication such as a bar code or two dimensional data symbol or the like provided on an optical disc.

In order to achieve the above object, the present invention is directed to an apparatus for reading an identification indication provided on an optical disk. The identification indication is provided in at least a part of an annular-shaped identification indication area formed between a program area and a clamping area of the optical disc, and the identification indication is formed with arrangement of a plurality of representations carrying predetermined information and has a reading end representation at the rear portion of the representations in the rotational direction of the optical disc. The apparatus comprising detecting means for optically acquiring the information of the identification indication of the optical disc; and discriminating means for discriminating based on an output from the detecting means as to whether or not the identification indication is accurately read; wherein said discriminating means includes a first determining means for determining based on the output from the detecting means as to whether the data acquired by the detecting means contains data of the reading end representation or an equivalent thereof; and a second determining means for determining based on the result of the determination of the first determining means as to whether or not the data acquired by the detecting means reaches a predetermined amount of data of the identification indication.

The discriminating means discriminates that the identification indication is accurately read in the case where the first determining means determines that the data acquired by the detecting means contains data of the reading end representation or an equivalent thereof, and the second determining means determines that the data acquired by the detecting means reaches the predetermined amount of data of the identification indication.

Further, the discriminating means discriminates that the data acquired by the detecting means is not data of the reading end representation in the case where the first determining means determines that the data acquired by the detecting means contains data of the reading end representation or an equivalent thereof but the second determining means determines that the data acquired by the detecting means does not reach the predetermined amount of data of the identification indication, and then the apparatus continues the data acquisition for the identification indication through the detecting means.

Therefore, according to the identification indication reading apparatus according to the present invention, it is possible to read the identification indication such as a bar code or a two-dimensional data symbol accurately even in the case where reading of the identification indication is started from the middle of the identification indication due to a positional relationship between the detector (photo-interrupter) and the identification indication at the time when the reading is to be carried out. Therefore, it is possible to read the identification indication without wasting the data once obtained.

In this apparatus, the discriminating means further includes a third determining means for determining as to whether or not the data acquired by the detecting means is data of a predetermined representation in the identification indication in the case where the first determining means determines that the data acquired by the detecting means does not contain data of the reading end representation nor an equivalent thereof, wherein the discriminating means discriminates that the detecting means is in the process of reading the identification indication in the case where the third determining means determines that the data acquired by the detecting means is data of the predetermined representation in the identification indication, and in such a case the apparatus continues the data acquisition through the detecting means; or the discriminating means discriminates that the data acquired by the detecting means is a noise other than the identification indication in the case where the third determining means determines that the data acquired by the detecting means is not data of the predetermined representation in the identification indication, and in such a case the apparatus discards the acquired data and then restarts the data acquisition through the detecting means.

According to the apparatus having the structure described above, it is possible to discriminate a signal of the identification indication from a signal resulted from a noise even if such a noise is generated by letters, marks and patterns indicated on the upper surface of the optical disc or scratches, dust or the like attached to the disc, thus enabling to read the identification indication provided on the optical disc accurately.

Furthermore, the discriminating means further includes a fourth determining means for determining, before the determination of the first determining means being carried out, as to whether or not the detecting means acquires any data within a predetermined time; wherein the discriminating means discriminates that the optical disc is one which does not have the identification indication in the case where the fourth determining means determines that the detecting means does not acquire any data within the predetermined time.

Therefore, according to this structure it is possible to discriminate as to whether or not the loaded disc is the type having the identification indication.

Preferably, the identification indication includes a bar code provided in the identification indication area of the optical disc in an arch-shaped manner. More preferably the bar code is arranged in such an order as to be read from the rear side of the rotational direction of the optical disc toward the front side thereof. In this case, the apparatus further includes means for inverting the acquired data and then outputting the inverted data.

Alternatively, the identification indication may be formed from a two-dimensional data symbol provided in the identification indication area of the optical disc in an arch-shaped manner.

Moreover, it is preferred that the optical disc has an underside surface in which signals are recorded and a top surface opposite thereto, wherein the identification indication is provided on the optical disc such that it is optically readable from either of the side of the underside surface or the top surface of the optical disc.

Furthermore, it is also preferred that the optical disc has an underside surface in which signals are recorded and a top surface opposite thereto, in which the identification indication is provided on the optical disc such that it is optically readable from either of side of the underside surface or the top surface of the optical disc, wherein the detecting means acquires the information of the identification indication from the side of the top surface of the optical disc.

Another aspect of the present invention is directed to a method for optically reading an identification indication provided on an optical disk. The identification indication is provided in a part of an annular shaped identification indication area formed between a program area and a clamping area of the optical disc, and the identification indication is formed with arrangement of a plurality of representations carrying predetermined information and has a reading end representation at the rear portion of the representations in the rotational direction of the optical disc. The method comprising detecting step for optically acquiring the information of the identification indication of the optical disc; first step for determining based on the data acquired in the detecting step as to whether the data acquired in the detecting step contains data of the reading end representation or an equivalent thereof; and a second step for determining based on the result of the determination in the first step as to whether or not the data acquired in the detecting step reaches a predetermined amount of data of the identification indication.

Other objects, structures and advantages of the present invention will be apparent when the following description of the preferred embodiment are considered taken in conjunction with the accompanying drawings.

DETAILED DESCRIPTION OF THE PREFERRED EMBODIMENTS

First, with reference to FIG. 1 and FIG. 3A, 3B, a photo CD will be described as an example optical disc which can be used in the identification indication reading apparatus of the present invention. A photo CD is a recordable type compact disc in which image data in the form of electronic data is recorded. The image data is obtained by reading a photographic film with a film scanner to produce the electronic data.

Figure 1:
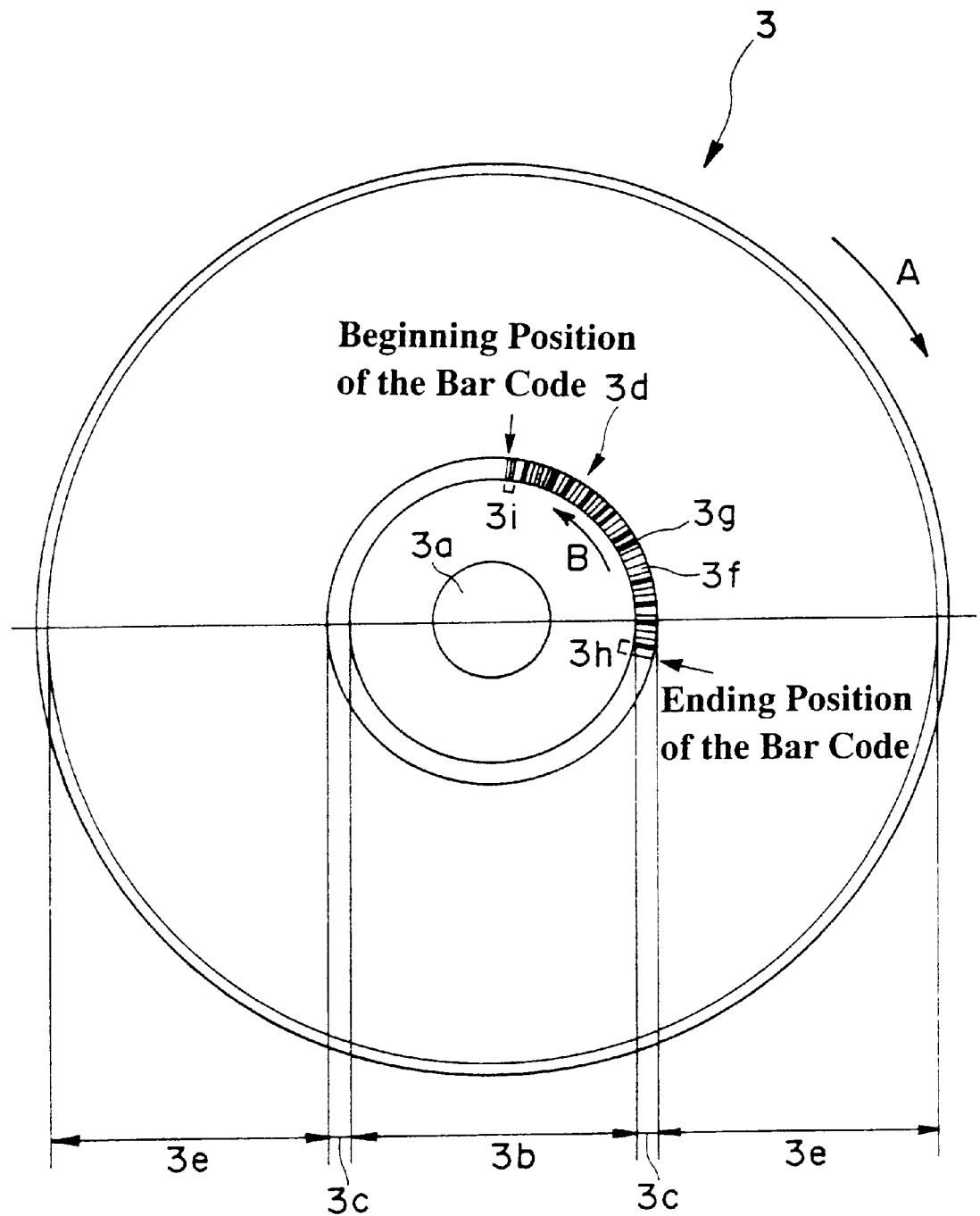
FIG. 1 is a planar view of an optical disc provided with a bar code which is used for the identification indication reading apparatus according to the present invention.

As shown in FIG. 1, the photo CD 3 has a circular shaped central hole 3a formed in the center portion of the photo CD 3. The underside surface (signal recorded surface) of the photo CD 3 includes a clamping area 3b provided around the central hole 3a, a bar code area (identification indication area) 3c provided around the clamping area 3b, and a program area 3e provided around the bar code area 3c.

In particular, the central hole 3a of the photo CD is adapted to fit onto a center hub 46a formed in the central portion of a turntable 46 described hereinbelow. Further, when the disc drive is driven, a disc clamper 80 (described below) is magnetically attracted to the turntable 46 and the clamping area 3b of the photo CD 3 is held between the disc clamper 80 and the turntable 46, whereby the photo CD 3 is rotated together with the turntable 46.

Namely, the bar code area 3c is an annular area provided outside the clamping area 3b and inside the program area 3e, and a bar code 3d as the identification indication in the present invention is provided in a portion of the bar code area 3c in an arc-shaped manner which extends over a prescribed angle. The provision of the bar code 3d makes is possible to specify the type of disc as well as other information such as the disc manufacturer and place and date of manufacturing.

Figure 3:
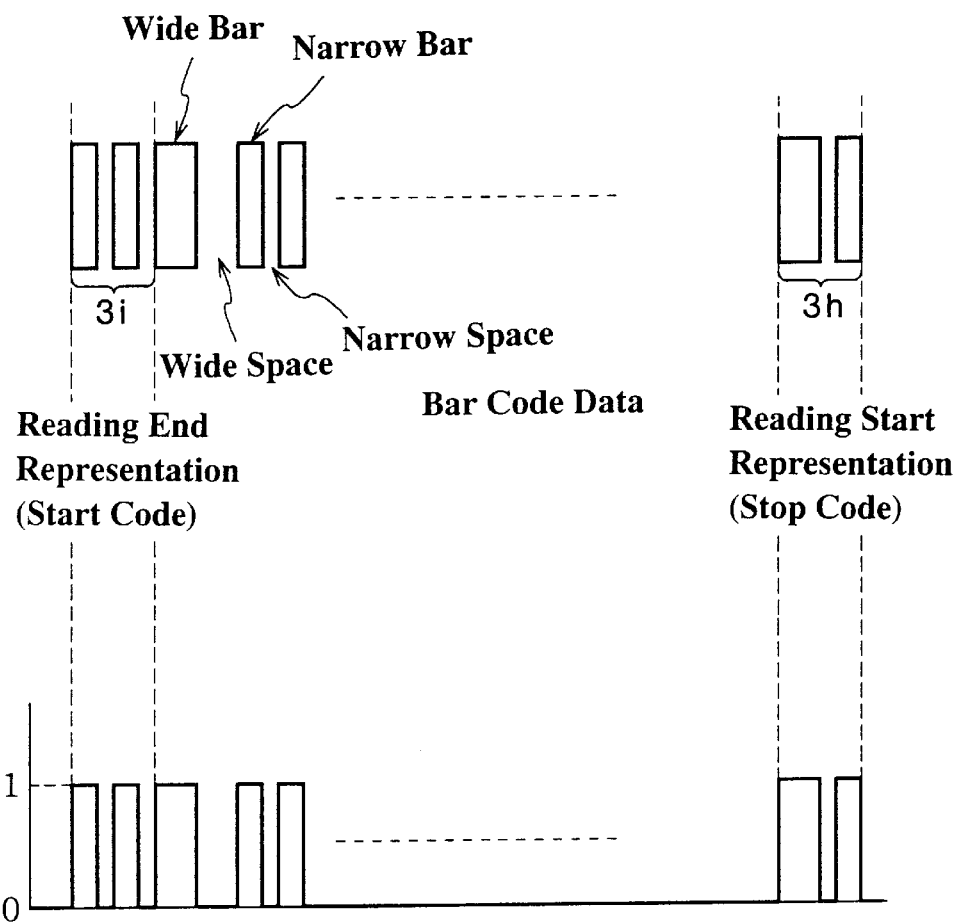
FIG. 3A is an enlarged view which shows the bar code attached to the optical disc used in the identification indication reading apparatus according to the present invention.
FIG. 3B is an illustration which shows the corresponding wave shapes of the digital signals produced from the bar code.

As shown in FIGS. 1 and 3A, the bar code 3d is constructed from a plurality of representations including bars 3f made up of thick and thin lines and a plurality of spaces 3g, which represent predetermined information. The bars 3f are comprised of two types of bar which include a wide bar and a narrow bar, and the spaces 3g are also comprised of two types of space which include a wide space and a narrow space. In the case of a photo CD, the bars 3f are transparent so as to allow light to pass therethrough. On the other hand, the spaces 3g are colored gold so as to reflect light. Further, the remaining portion of the bar code area 3c which is not provided with the bar code 3d is colored in the same manner as the spaces 3g. Accordingly, it is possible to optically read out the bar code 3d from either above or below the disc. In actuality, when the bar code 3d is to be read out, a sensor (bar code reader) such as a photo-interrupter or the like is used. In this connection, for better understanding, the bars 3f are shown as black lines in FIG. 1.

Further, a reading start representation (indication) 3h and an reading end representation (indication) 3i for marking the beginning and end of the reading are provided at the opposite ends of the bar code. Namely, as the optical disc rotates in the clockwise direction (as shown by the arrow A in FIG. 1), the reading start representation 3h is positioned at the very front of the rotating bar code and the reading end representation 3i is positioned at the very rear of the rotating bar code. Accordingly, the bar code is read in order from the reading start representation 3h toward the reading end representation 3i (as shown by the arrow B in FIG. 1).

The reading start representation 3h and the reading end representation 3i are constructed with a prescribed arrangement of bar and space. For example, as shown in FIG. 3A, the reading start representation 3h can be constructed from a narrow bar, a narrow space and a wide bar arranged from front to rear with respect to the rotational direction of the disc, and the reading end indication 3i can be constructed from a narrow space, a narrow bar, a narrow space and a narrow bar arranged from front to rear with respect to the rotational direction of the disc. Now, in the case where the bar code of a photo CD is to be read, the standard order of reading the bar code is from the rear to the front. Therefore, the reading end representation 3i is designated as the start code, and the reading start representation 3h is designated as the stop code.

Further, the program are 3e is the area into which the above-described image data is recorded. The data which is recorded in the program area 3e is read out from the underside of the disc by means of an optical pick-up 47 which is capable of moving in the radial direction of the disc.

Figure 4:
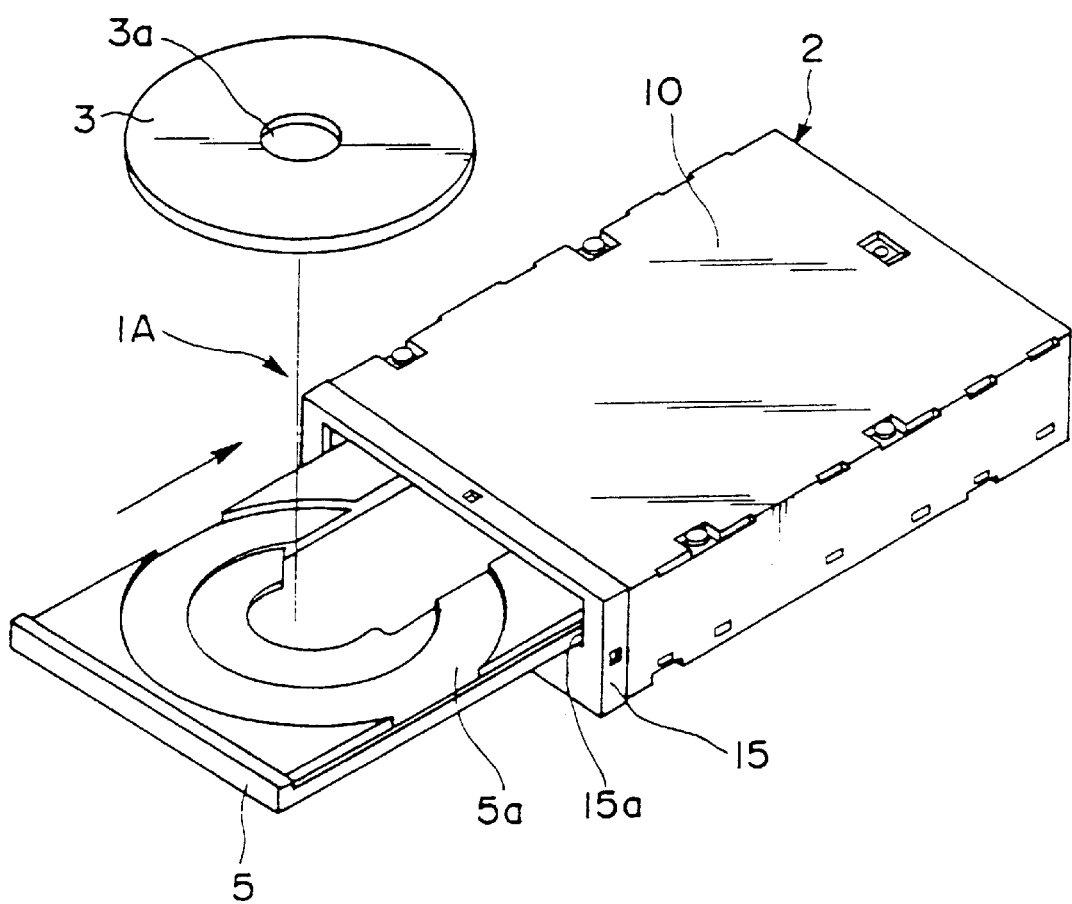
FIG. 4 is a perspective view of a disc drive which is used in the identification indication reading apparatus according to the present invention.

A detailed description of the preferred embodiments of an identification indication reading apparatus according the present invention will now be given below with reference to the appended drawings. FIG. 4 is a perspective view of a disc drive 1A to which the identification indication reading apparatus of an embodiment according to the present invention is applied. As shown in FIG. 4, the disc drive 1A of the present invention is a device for playing back or recording and playing back an optical disc 3, such as a photo CD or the like. The disc drive 1A is roughly constructed from the main body 2 and a disc tray 5 which moves in the forward and backward direction (horizontal direction) with respect to the main body 2 in order to transport the optical disc 3.

The main body 2 includes a circuit substrate assembly (not show in the drawings) and a mechanism assembly provided on the circuit substrate assembly, and they are housed in a casing 10.

The casing 10 is constructed from a plurality of metal plates, with the front portion thereof being provided with a front panel 15 having an aperture 15a.

Figure 5:
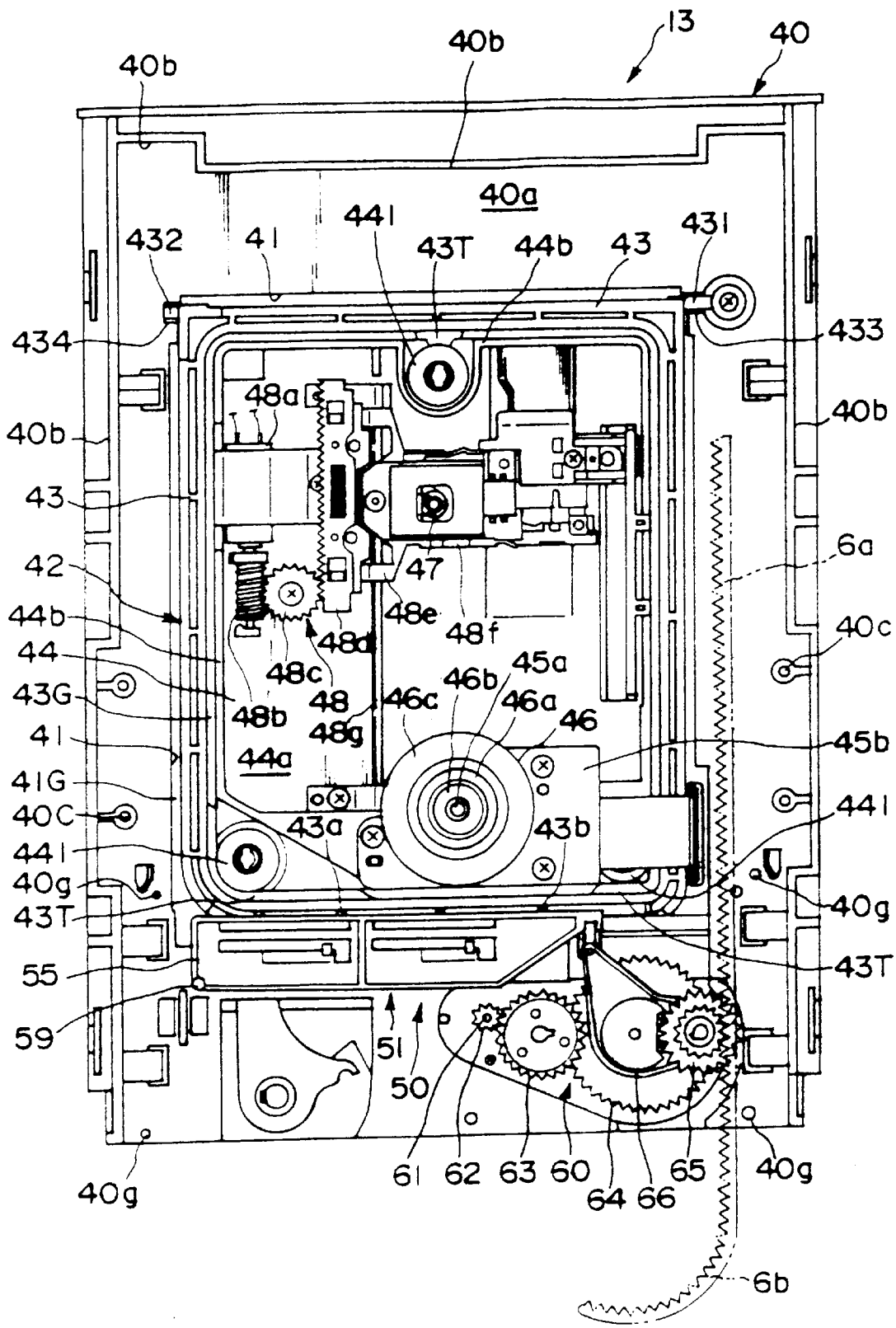
FIG. 5 is a planar view of a main body of the disc drive shown in FIG. 4, in which a mechanism unit is shown in a lowered position.
Figure 6:
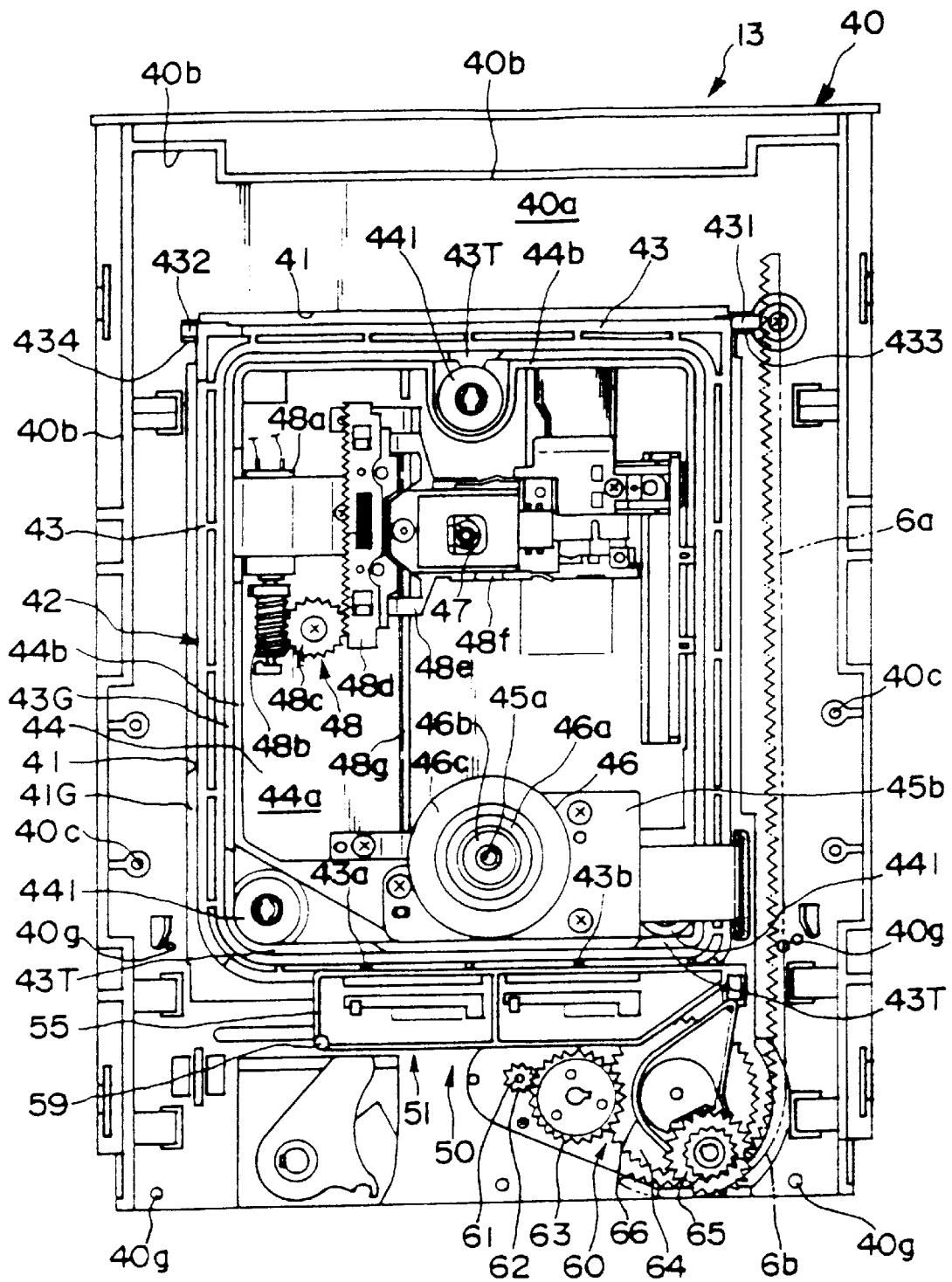
FIG. 6 is another planar view of the main body of the disc drive shown in FIG. 4, in which the mechanism unit is shown in a raised position.

FIG. 5 is a planar view of a main body 2 of the above embodiment from which the casing 10 is removed, which shows a state in which a mechanism unit 42 is in a lowered position (lower position), and FIG. 6 is another planar view of the main body 2 of the same embodiment, which shows a state in which the mechanism unit 42 is in a raised position (upper position).

As shown in FIGS. 5 and 6, the mechanism assembly 13 which is housed inside the casing 10 is shaped roughly like a container and includes an chassis 40 which is preferably constructed from a hard resin. The chassis 40 is constructed from a roughly rectangular-shaped bottom portion 40a and a U-shaped wall portion 40b which stands erect along the left, right and back edge portion of the bottom portion 40a.

In this way, no wall portion is formed in the front of the chassis 40 in order to allow the front of the chassis 40 to be open. Further, when the mechanism assembly 13 is assembled into the casing 10, the open front portion of the chassis 40 is aligned with the aperture 15a of the front panel 15 provided on the casing 10, so that the disc tray 5 can be moved into and out of the casing 10 through the aperture 15a.

As shown in FIG. 4, the disc tray 5 is provided with a shallow concave disc supporting portion 5a into which the optical disc 3 is placed to enable the optical disc 3 to be transported to a prescribed disc loaded position.

Figure 7:
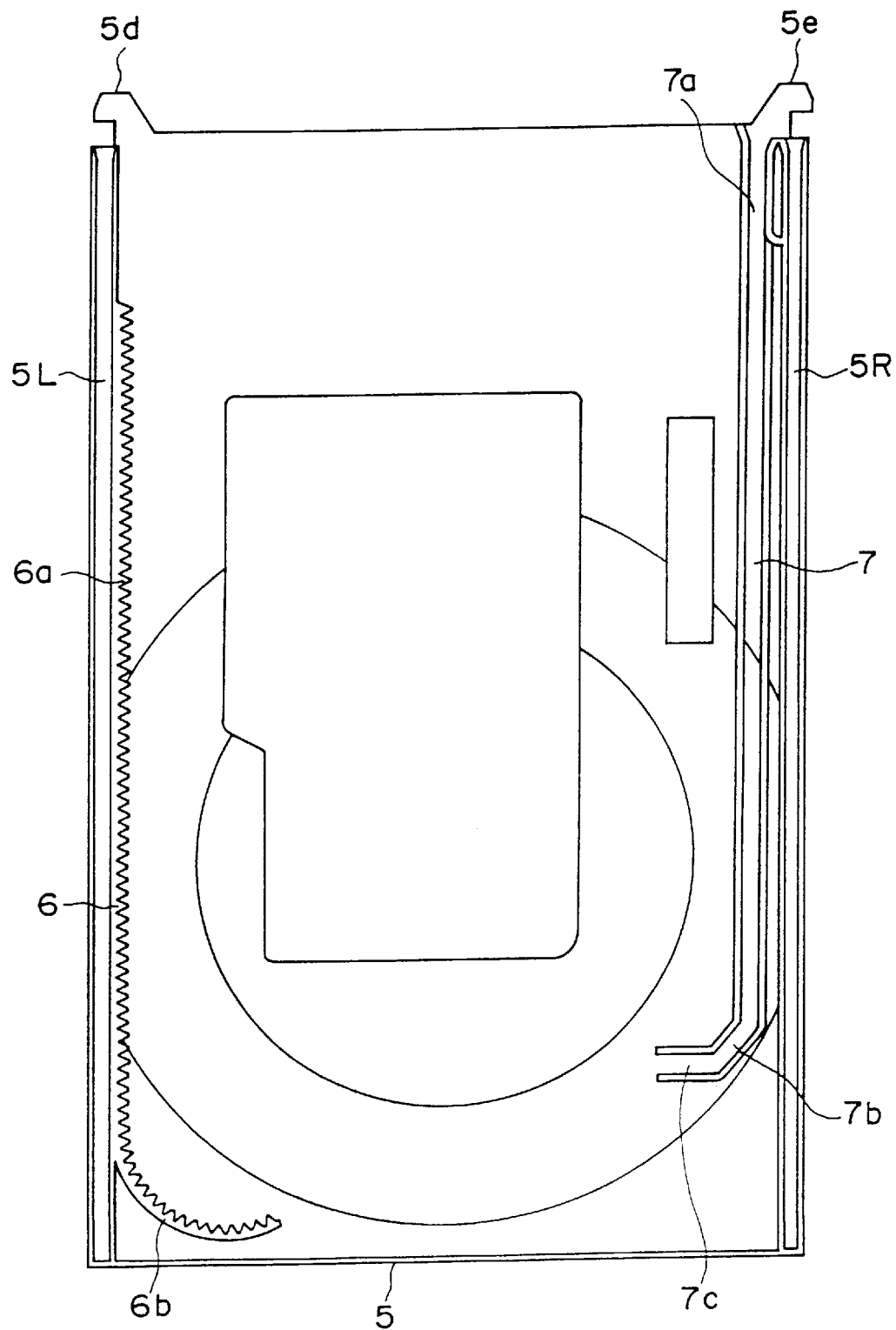
FIG. 7 is a bottom view which shows the construction of the underside of a disc tray of the disc drive.

As shown in FIG. 7, on the left and right portions of the bottom portion 40a of the chassis 40, there are provided with protruding guide members 40g, 40g (FIGS. 5, 6) which respectively engage with guide grooves 5L, 5R formed in left and right side portions of the underside surface of the disc tray 5. Further, the underside surface of the disc tray 5 is further provided with a rack gear 6. The rack gear 6 includes a first rack 6a which extends straight in the forward and backward direction along the guide groove 5L and a roughly 90 degree arc-shaped second rack 6b which is formed at the front end portion (the front side of the disc tray 5, as shown in the lower portion of FIG. 7) of the first rack 6a so as to be continuous therewith.

Further, as shown in FIG. 7, a cam member movement restricting groove 7 is provided on the underside surface of the disk tray 5 along the guide groove 5R which is positioned at the opposite side of the first rack 6a. This cam member movement restricting groove 7 is constructed from a first movement restricting groove 7a which extends parallel to the first rack 6a, a second movement restricting groove 7b which slants at a roughly 45 degree angle with respect to the first movement restricting groove 7a, and a third movement restricting groove 7c which slants at a roughly 45 degree angle with respect to the second movement restricting groove 7b. Accordingly, the third movement restricting groove 7c is arranged at a roughly 90 degree angle with respect to the first movement restricting groove 7a.

Further, as shown in FIGS. 5 and 6, the chassis 40 is provided with a mechanism unit 42 equipped with a turntable 46 for rotating an optical disc 3, an optical pick-up 47 for playing back or recording and playing back the optical disc 3. The mechanism unit 42 is arranged inside a roughly rectangular-shaped opening 41 formed in the bottom portion 40a of the chassis 40, with the rear portion of the mechanism unit 42 being supported in a manner that makes it possible for such rear portion to pivot with respect to the chassis 40 in order to enable the front portion of the mechanism unit 42 to be displaced between the raised position (upper position; FIG. 6) in which the optical disc 3 is supported on the turntable 46 and the lowered position (lower position; FIG. 5) which is lower than the raised position.

In particular, as shown in FIGS. 5 and 6, the mechanism unit 42 includes a base frame 43 constructed preferably from hard resin, and a support member (support plate) 44 which is supported by the base frame 43 via an elastic member (insulator) 441.

The base frame 43 is formed so as to have a roughly rectangular shape which includes a front portion and a rear portion. Formed on the left and right side portions of the rear side of the base frame 43 (the back portion of the main body 2) are protruding axles 431, 432 which act as pivotal axles to enable the mechanism unit 42 to pivot with respect to the chassis 40. These axles 431, 432 are inserted into respective axle holes 433, 434 formed in the opposite inner sides of the chassis 40. By mounting the rear portion of the mechanism unit 42 with the axles 431, 432 in this way, the front portion of the mechanism unit 42 is able to pivot with respect to the chassis 40 between the lowered position shown in FIG. 5 and the raised position shown in FIG. 6.

Figure 8:
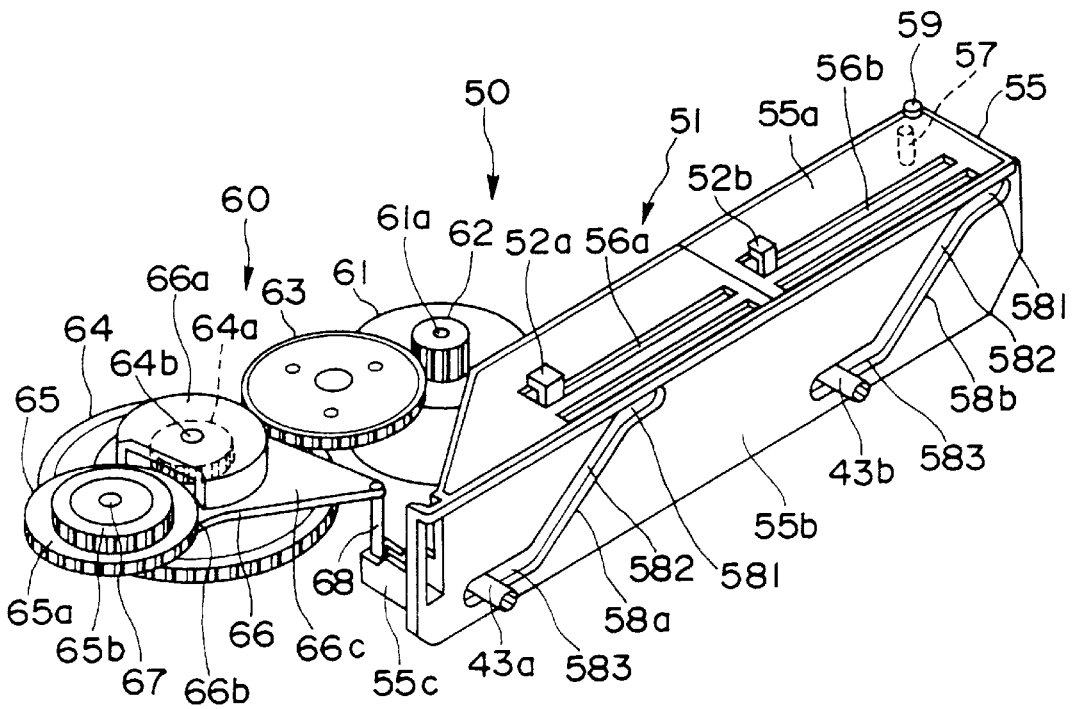
FIG. 8 is a perspective view showing the structure of a cam member used in the disc drive, in which the cam member is shown in a first position.
Figure 9:
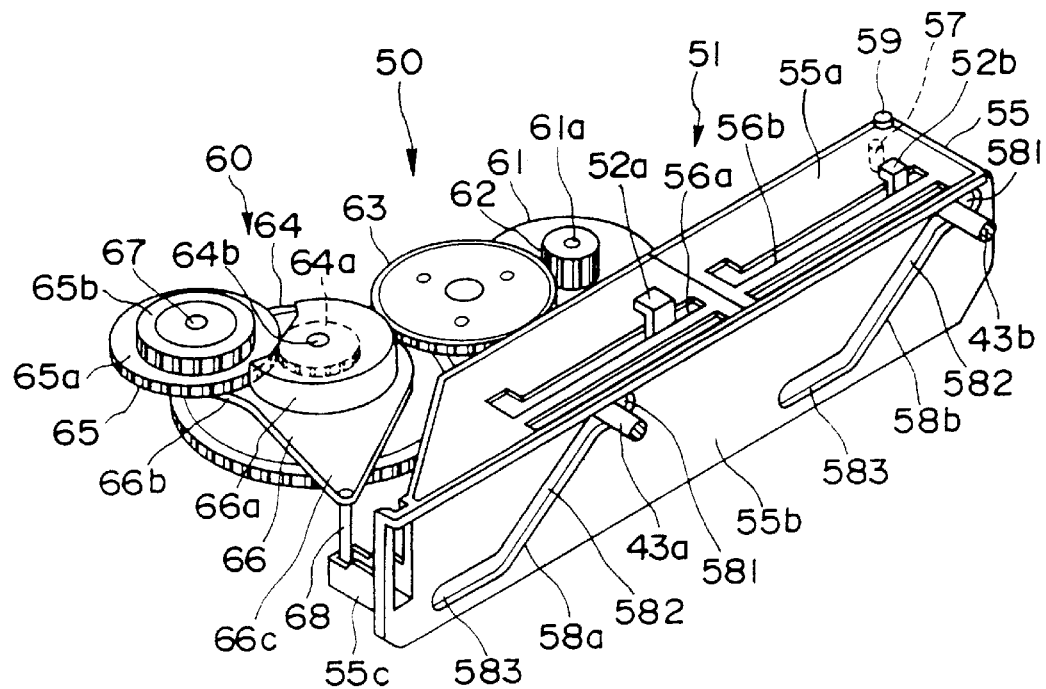
FIG. 9 is a perspective view showing the structure of the cam member used in the disc drive, in which the cam member is shown in a second position.

Further, a pair of protruding guide pins 43a, 43b are formed on the front of the base frame 43 (See FIGS. 8 and 9). These guide pins 43a, 43b are engaged respectively with cam grooves 58a, 58b of a cam member 55 of a cam mechanism 51 (described hereinbelow) through a pair of guide slots (not shown in the drawings) formed in the wall of the front portion of the chassis 40 which defines the opening 41 of the chassis 40. This enables the front portion of the base frame 43 to be guided up or down in accordance with the displacements of the cam member 55.

Taking the possibility of deformation (thermal deformation or the like) of the chassis 40 into account, a spacing 41G is provided between the base frame 43 and the chassis 40 which defines the opening 41. Specifically, this spacing 41G is provided around roughly the entire circumference of the base frame 43. With this result, the pivotal movement of the base frame 43 will not be hindered even when the chassis 40 undergoes maximum distortion.

The support member 44 is constructed from a roughly rectangular-shaped bottom plate portion 44a and a wall portion 44b formed around the circumference of the bottom plate portion 44a. The wall portion 44b is one size smaller than the base frame 43 such that the wall portion 44b is arranged inside the frame of the base frame 43 via a prescribed spacing 43G. The support member 44 is supported by the base frame 43 via the elastic members (insulators) 441 provided on tabs 43T formed at the left and right corner portions of the front side of the base frame 43 and at roughly the middle of the rear portion of the base frame 43. Namely, the support member 44 is supported on the base frame 43 via the elastic members 441 provided at three points which roughly form an isosceles triangle.

Figure 10:
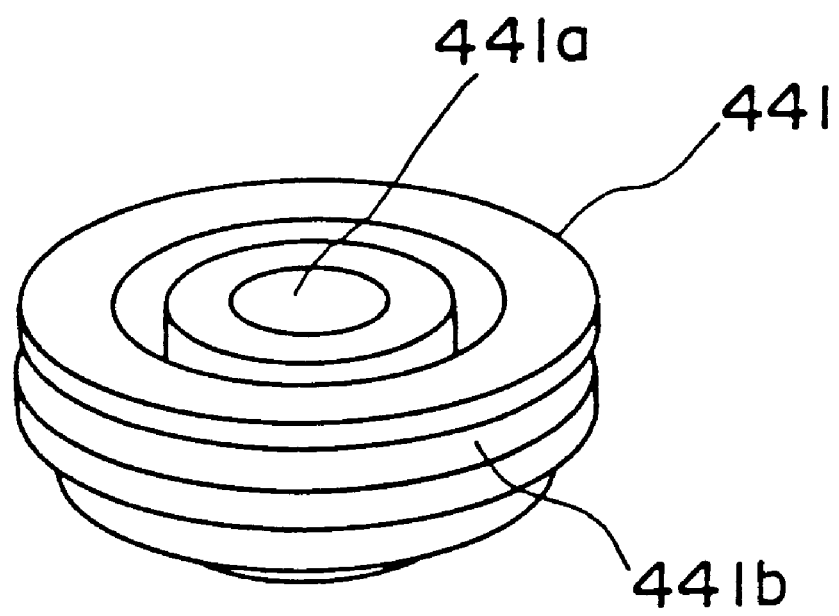
FIG. 10 is a perspective view which shows the structure of the insulator used in the disc drive.

As shown in FIG. 10, each elastic member 441, which is formed from an elastic material such as rubber or the like, has a roughly cylindrical shape and includes a center hole 441a which is formed in an axial direction thereof and a groove 441b formed in the outer circumferential surface in the circumferential direction thereof. Further, the center hole 441a of each elastic member 441 fits onto an axis provided on the respective tabs 43T of the base frame 43 and then the groove 441b fits over a respective notched portion formed at the corresponding position of the support member 44, Further, as shown in FIGS. 5 and 6, the support member 44 is provided with a spindle motor 45 for rotating an optical disc 3, a turntable 46 fixed to a rotation axis 45a of the spindle motor 45, and optical pick-up 47 (which includes an actuator), and an optical pick-up moving mechanism 48 for moving the optical pick-up 47 in the radial direction of the optical disc 3. The spindle motor 45 is mounted on a motor support 45b which is fixed to the support member 44 and which is formed from a metalic plate. The spindle motor 45 is capable of rotating the optical disc 3 at a high rotational speed, for example, at a speed capable of rotating the optical disc 3 at 200–6400 rpm.

The turntable 46 is a disc-shaped member which includes a protruding ring-shaped center hub 46a formed in the center portion of the turntable 46. This center hub 46a is adapted to fit into a center hole 3a of the optical disc 3. Further, the center hub 46a is formed so as to taper from the tip to the base in order to prevent the optical disc 3 from slipping off center when placed on the turntable 46. Further, a ring-shaped permanent magnet 46b for creating an attraction force on a disc clamper (described below) is provided in the center hub 46a in the circumferential direction of the rotation axis 45a of the spindle motor 45.

Further, a ring-shaped pad 46c is bonded to the upper part of the turntable 46 (i.e., the side used to support the optical disc 3) around the circumference of the center hub 46a. The pad 46c is made from an elastic material, such as various rubbers, soft resins or porous materials (sponges), which is constructed so as to have a relatively high coefficient of friction in order to prevent the optical disc 3 from slipping when rotating the optical disc 3.

The optical pick-up 47 is a flat type optical pick-up constructed so as to deflect light reflected from the optical disc 3 by roughly 90 degrees using a mirror (or prism) or the like to guide such light toward a light gathering element such as a photodiode or the like.

As shown in FIGS. 5 and 6, the optical pick-up moving mechanism 48 is constructed from a sled motor 48a capable of forward/reverse rotation, a worm 48b which is attached to a rotational axis of the motor 48a, a worm wheel 48c which meshes with the worm 48b, a rack gear 48d which meshes with the worm wheel 48c, a slider 48e which is fixed to the rack gear 48d, a guide rod 48g which regulates the direction of movement of the slider 48e, and a head support (actuator base) 48f which is integrally formed with the slider 48e. The optical pick-up 47 is provided on the head support 48f. Further, the worm 48b and the guide rod 48g are arranged so that their lengthwise directions are directed roughly parallel to the forward and backward direction of the disc drive 1A.

In this type of optical pick-up moving mechanism 48, if the worm 48b is rotated in a prescribed direction by the motor 48a, this rotation is transmitted through these gears, and this force causes the slider 48e to move along the guide rod 48g in the forward-backward direction of the disc drive 1A, whereby the optical pick-up 47 fixed to the head support 48f is moved in the radial direction of the loaded optical disc 3. In this construction, the optical pick-up 47 and the optical pick-up moving mechanism 48 form a playback means for reproducing information recorded in the program area 3e of the optical disc 3.

Further, the operations of the spindle motor 45, the motor 48a for moving the optical pick-up 47 and a loading motor 61 (described below) are controlled by a control means (CPU) provided in the circuit substrate assembly (not shown in the drawings).

As shown in FIGS. 5 and 6, in front of the mechanism unit 42, there is provided a loading mechanism 50 for displacing the mechanism unit 42 between the lowered position (FIG. 5) and the raised position (FIG. 6) as well as for moving the disc tray 5 between the play back position and the eject position. Namely, the loading mechanism 50 includes a cam mechanism 51 which is cooperated with the mechanism unit 42 and can be displaced between a first position (FIG. 5) and a second position (FIG. 6), and a driving mechanism 60 for moving (driving) the disc tray 5 and the cam mechanism 51.

The cam mechanism 51 is operated to displace the mechanism unit 42 into the lowered position when the cam mechanism is in the first position shown in FIG. 5 and to displace the mechanism unit 42 into the raised position when it is in the second position shown in FIG. 6. In more details, as shown in FIGS. 8 and 9, the cam mechanism 50 includes a cam member 55 arranged so as to be slidable between the first position (FIG. 8) and the second position (FIG. 9) in the sideways direction with respect to the chassis 40 (i.e., the horizontal direction orthogonal to the direction of movement of the disc tray 5). The cam member 55 is constructed from a roughly plate-shaped horizontal portion 55a and a plate-shaped vertical portion 55b which is integrally formed with one lengthwise edge of the horizontal portion 55a so as to make a structure having a roughly L-shaped cross section.

Formed on the horizontal portion 55a of the cam member 55 are sideways guide grooves 56a, 56b which engage respectively with a pair of protrusions 52a, 52b which protrude from the top of the front portion of the chassis 40.

Further, the vertical portion 55b of the cam member 55 is positioned to face the front wall which defines the opening 41 of the chassis 40. Formed in the vertical portion 55b are a pair of cam grooves 58a, 58b each having the same shape. Namely, each of the cam grooves 58a, 58b is constructed from a horizontally extending upper groove 581 and lower groove 583 and a slanting groove 582 which connects the upper groove 581 and lower groove 583.

Further, the guide pins (following members) 43a, 43b adapted for insertion into the cam grooves 58a, 58b, respectively, are protrudingly provided on the front surface of the base frame 43 of the mechanism unit 42 as described above. In this way, when the cam member 55 is moved between the first position and the second position, the guide pins 43a, 43b are moved by the slide abutment with the cam grooves 58a, 58b in the up and down direction.

Namely, when the cam member 55 is positioned at the first position, the guide pins 43a, 43b are engaged with the lower grooves 583 (FIG. 8), and the front portion of the mechanism unit 42 is kept in the lowered position shown in FIG. 5. When the cam member 55 is moved from the first position to the second position, the guide pins 43a, 43b move up by the slanting grooves 582, thereby causing the front portion of the mechanism unit 42 to move from the lowered position toward the raised position. Then, when the cam member 55 reaches the second position, the guide pins 43a, 43b engage with the upper grooves 581 (FIG. 9), and the front portion of the mechanism unit 42 is displaced to the raised position shown in FIG. 6.

Further, a protrusion 59 is integrally formed on an end portion of the horizontal member 55a of the cam member 55 to engage with the cam member movement restricting groove 7 formed in the underside surface of the disc tray 5. As a result, when the protrusion 59 is engaged with the first movement restricting groove 7a of the disc tray 5, the cam member 55 is prevented from moving in the sideways direction, whereby the cam member 55 is held at the first position. Then, in accordance with the movement of the disc tray 5, the protrusion 59 slides from the first movement restricting groove 7a to the second movement restricting groove 7b, and upon moving through the slanting groove of the second movement restricting groove 7b, the cam member 55 is displaced within the range of the lower grooves 583 of the cam grooves 58a, 58b of the cam member 55. Then, when the protrusion 59 reaches the position of the third movement restricting groove 7c, the cam member 55 is allowed to move toward the second position.

As shown in FIGS. 8 and 9, the drive mechanism 60 includes a loading motor 61 capable or forward/reverse rotation provided on the underside surface of the front portion of the chassis 40, a pinion gear 62 mounted on a rotation axis 61a of the motor 61, a medium-diameter second gear 63 which meshes with the pinion gear 62, and a large-diameter third gear 64 which meshes with a small gear (not shown in the drawings) fixed coaxially below the second gear 63. Further, a small-diameter cylindrical portion is integrally formed on top of the third gear 64 so as to be coaxial therewith, with a small gear 64a being integrally formed on top of this cylindrical portion so as to be coaxial therewith. Meshing with the small gear 64a of the third gear 64 is an operative gear 65 which meshes with the first and second racks 6a, 6b of the disc tray 5. Namely, the operative gear 65 includes a lower gear 65a which meshes with the small gear 64a of the third gear 64, and an upper gear 65b which meshes with the first and second racks 6a, 6b of the disc tray 5, in which the upper gear 65b being integrally formed on the same axis as the lower gear 65a.

In the present embodiment, the gears 62–65 are flat teeth gears, which constitute a rotational speed reduction mechanism for the loading motor 61 of the loading mechanism 50.

The operative gear 65 is provided so as to be capable of rotation about a rotation axis 67 provided on a planetary arm 66 mounted to a revolution axis 64b of the third gear 64. The planetary arm 66 includes a rotation portion 66a which is rotatably fitted onto the cylindrical portion of the third gear 64, and first and second arms 66b, 66c which extend from the rotation portion 66a, so that the whole of the planetary arm 66 has a roughly v-shaped structure.

One end of the first arm 66b of the planetary arm 66 is provided with the protruding rotation axis 67 to which the operative gear 65 is rotatably mounted as described above. Namely, the operative gear 65 rotates about the axis 67 of the first arm 66b which functions as a rotation axis thereof as well as the operative gear 65 also turns around the axis 64b which functions as a revolution axis, so that the operative gear 65 functions as a planetary gear which can be turned around the axis 64b along the second rack 6b with being rotated about the axis 67. In this planetary gear mechanism, the operative gear 65 acts as a planet gear and the small gear 64a of the third gear 64 acts as a sun gear. Further, the end of the second arm 66c of the planetary arm 66 is provided with a pin 68 which protrudes downward into an engaging portion 55c formed in the cam member 55.

In this connection, as shown in FIGS. 8 and 9, one part of the rotation portion 66a of the planetary arm 66 is partially cut away to expose the small gear 64a of the third gear 64 in order to enable the lower gear 65a of the operative gear 65 to mesh with the small gear 64a of the third gear 64.

In this structure, the operative gear 65 carries out a first operation when engaged with the first rack 6a of the disc tray 5, in which the disc tray 5 is moved between the disc eject position and the disc loaded position with the cam member 55 being held at the first position, and a second operation when engaged with the second rack 6b of the disc tray 5, in which the cam member 55 is moved between the first position and the second position.

Namely, while the protrusion 59 provided on the top of the horizontal portion 55a of the cam member 55 is in engagement with the first movement restricting groove 7a in the underside surface of the disc tray 5, the movement of the cam member 55 from the first position to the second position is restricted. Accordingly, during such time, that is during the time that the disc tray 5 is moving between the eject position and the loaded position, since the pin 68 of the second arm 66c of the planetary arm 66 is engaged with the engagement portion 55c of the cam member 55, it is impossible for the planetary arm 66 to be turned around the axis 64b. As a result, the operative gear 65 is held at a prescribed position while the protrusion 59 of the cam member 55 is in engagement with the first movement restricting groove 7a of the disc tray 5. In this state, as shown by the dashed line in FIG. 5, the operative gear 65 engages with the first linear rack 6a of the disc tray 5, whereby the disc tray 5 is moved between the disc eject position and the disc loaded position by the rotation of the operative gear 65 according to the rotation of the loading motor 61, and in this way the operative gear 65 functions as a driving gear for moving the disc tray 5.

On the other hand, when the disc tray 5 moves accordingly to a position just before the disc loaded position, the protrusion 59 of the cam member 55 also moves from the first movement restricting groove 7a to the second movement restricting groove 7b of the disc tray 5, and this causes the cam member 55 to be displaced by a small amount. Then, the disc tray 5 moves further, and when abutting portions 5d, 5e of the disc tray 5 come into abutment with wall portions 40b of the chassis 40 and thereby further movement of the disc tray 5 is restricted, the protrusion 59 reaches the third movement restricting groove 7c, whereby the cam member 55 is able to move from the first position to the second position. In this state, as shown by the dashed line in FIG. 6, since the operative gear 65 engages with the arc-shaped second rack 6b and the cam member 55 is able to move to the second position and therefore the planetary arm 66 can be turned around the axis 64b, the operative gear 65 moves along the arc-shaped second rack 6b in accordance with the rotation of the loading motor 61.

In accordance with such a turning movement of the operative gear 65, the planetary arm 66 rotates clockwise around the common axis 64b from the position shown in FIG. 8 to the position shown in FIG. 9, which in turn causes the second arm 66c of the planetary arm 66 to rotate in the same direction. In accordance with this rotation of the second arm 66c, the cam member 55 is driven by means of the pin 68 coupled with the engaging portion 55c and moves from the first position shown in FIG. 8 toward the second position shown in FIG. 9. In accordance with this movement of the cam member 55 from the first position toward the second position, the front guide pins 43a, 43b of the base frame 43 of the mechanism unit 42 rise up along the slanting grooves 582, 582, whereby the front portion of the mechanism unit 42 is displaced from the lowered position shown in FIG. 5 to the raised position shown in FIG. 6.

Figure 11:
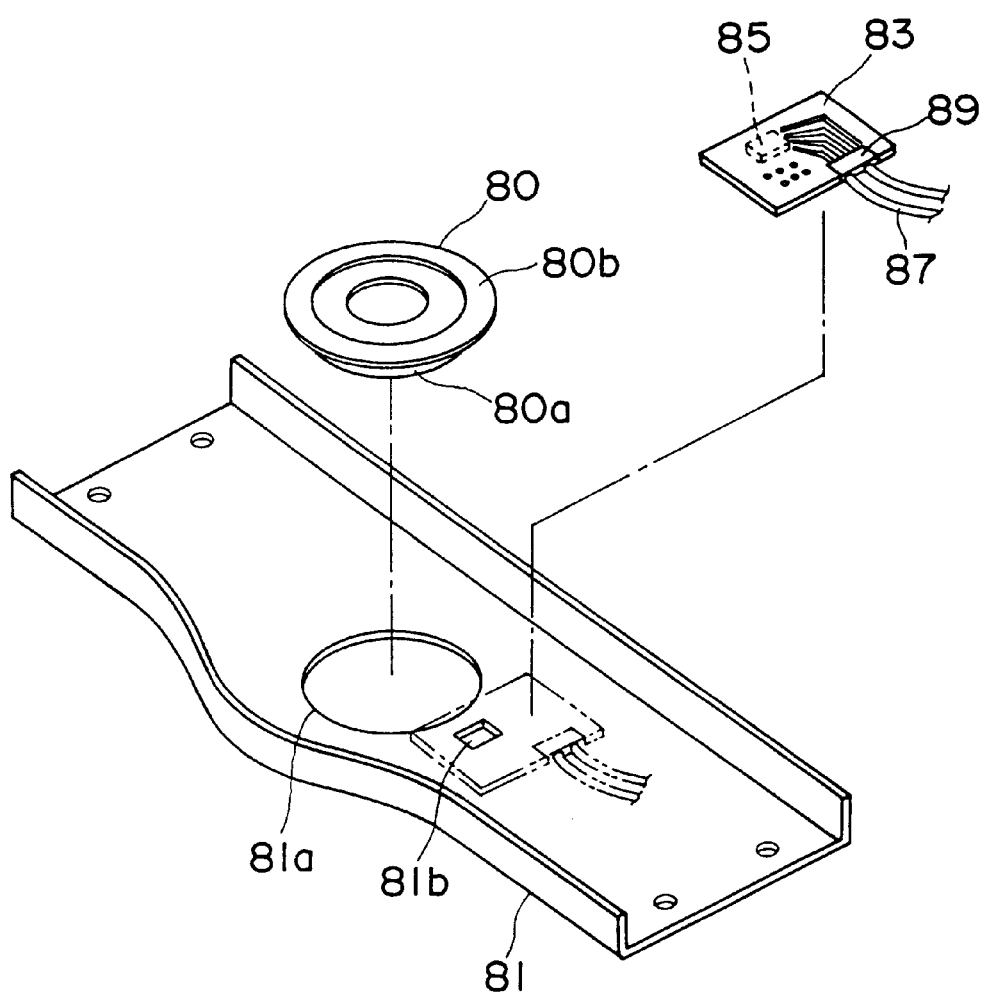
FIG. 11 is a perspective view showing the structure of a disc clamper and the mounting position of a bar code reader used in the disc drive.

Further, a disc clamper 80 is provided on the upper portion of the chassis 40, and as shown in FIG. 11, the disc clamper 80 is rotatably supported by a plate-shaped support member 81 having a central opening 81a.

In more details, the support member 81 is fastened at its both ends to bosses (or rivets) formed on mounting portions 40c of the opposite side walls 40b, 40b of the chassis 40 so that the support member 81 is secured to the chassis 40 in the side-ways direction. On the other hand, the disc clamper 80 is formed from a flat drum-shaped main body 80a having a bottom portion that is inserted into the opening 81a of the support member 81, and a flange portion 80b which is formed around the upper circumferential portion of the main body 80a. The flange portion 80b is adapted to be supported on the top surface of the support member 81. Further, an annular steel attraction member is provided inside the main body 80a, and it is adapted to be pulled by the permanent magnet provided in the turntable 46.

Figure 12:
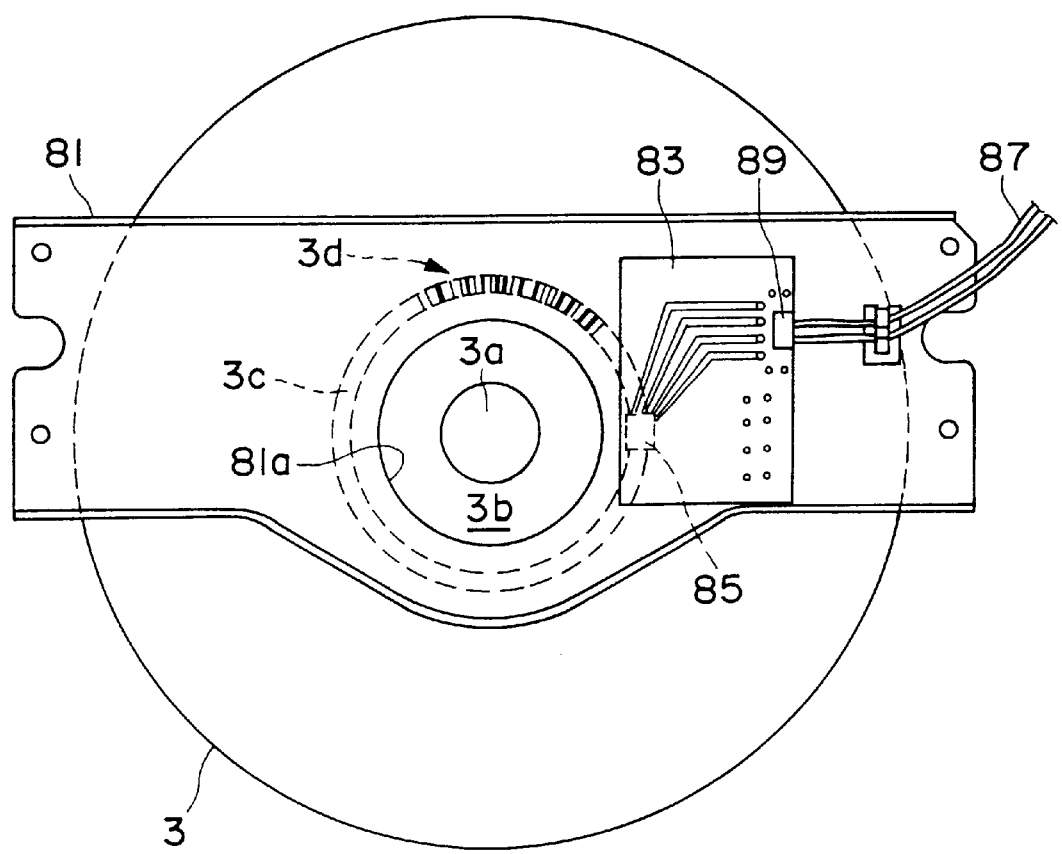
FIG. 12 is a top planar view which shows the state where the bar code of the optical disk is read by a bar code reader of the disc drive.
Figure 13:
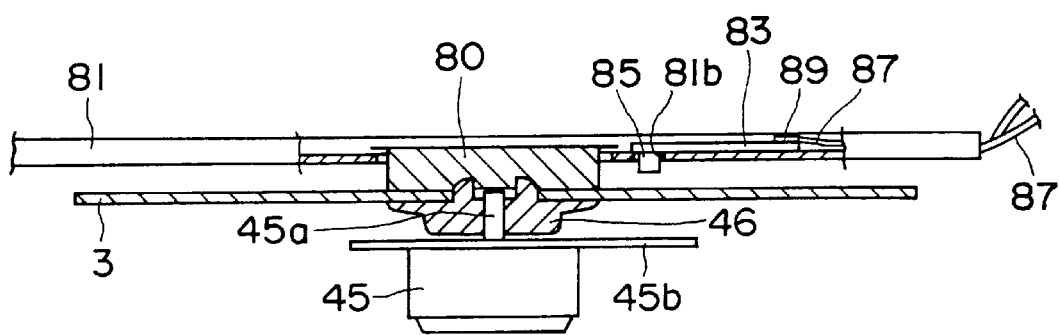
FIG. 13 is a cross-sectional view which shows the state where the optical disc is loaded and the bar code is read by the bar code reader of the disc drive.

Further, as shown in FIGS. 11 through 13, a circuit substrate 83 is also provided on the support member 81. Provided on the surface of the circuit substrate 83 which is in contact with the support member 81 is a photo-interrupter (bar code reader) 85 which includes a light emitting element and a light receiving element (not shown in the drawings). The photo-interrupter functions as a detection means for optically acquiring information from the bar code 3d of the optical disc 3. Further, a signal line 87 for outputting signals (data) from the photo-interrupter 85 extends from one end of the circuit substrate 83 via connector 89. The photo-interrupter 85 constitute a part of the identification indication reading apparatus.

On the other hand, an aperture 81b separate from aperture 81a is formed in the support member 81. This aperture 81b is provided so as to be positioned above the bar code area 3c when the optical disc 3 is in a loaded position, and the photo-interrupter 85 described above is positioned above the aperture 81. Accordingly, when the optical disc 3 is loaded, the photo-interrupter 85 is positioned on the opposite side of the optical disc relative to the optical pick-up 47 at a position corresponding to the bar code area 3c.

Next, the identification indication reading apparatus of the present invention will be described with reference to the block diagram shown in FIG. 14.

Figure 14:
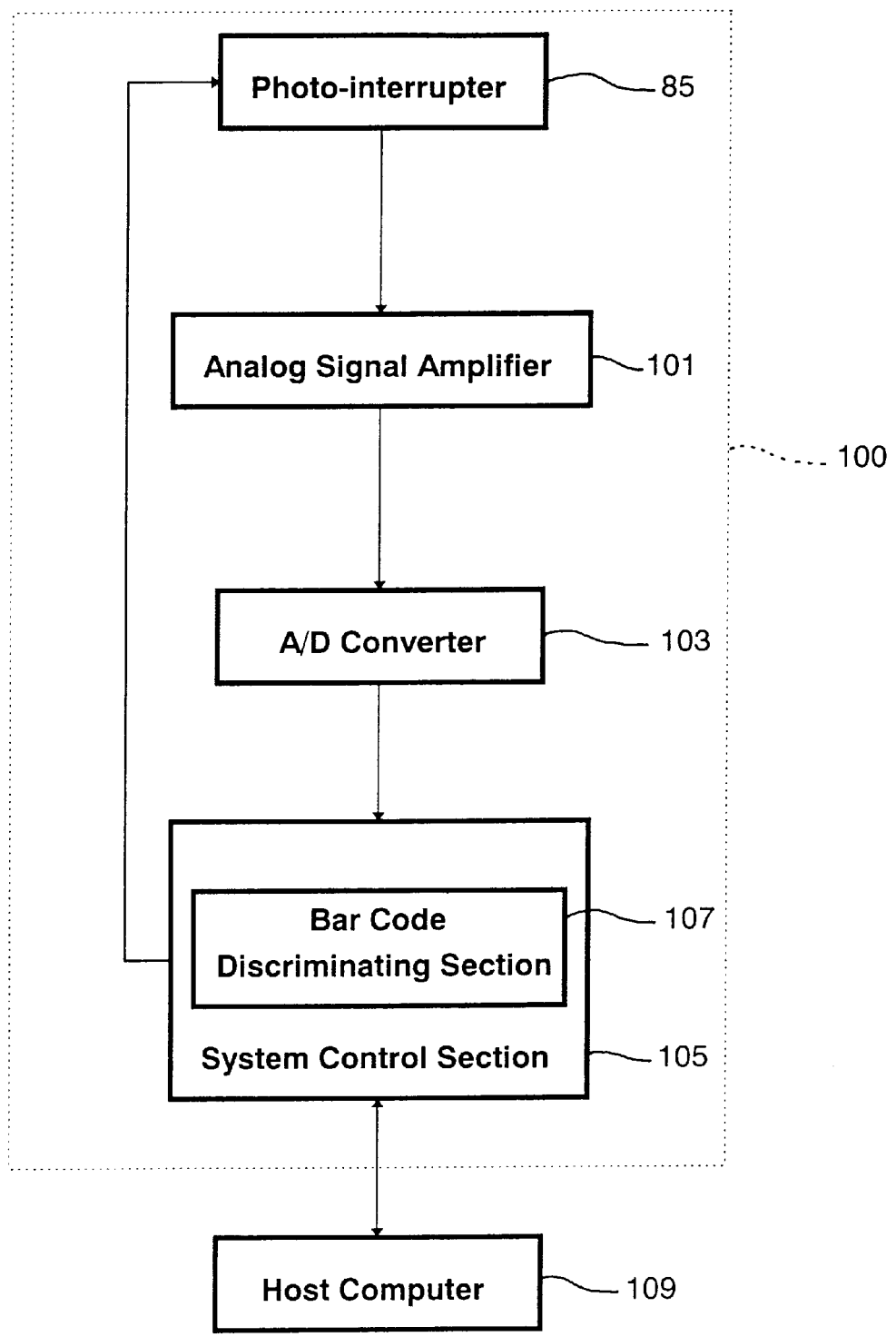
FIG. 14 is a block diagram which shows a bar code signal processing circuit between the disc drive according to the present invention and a personal computer equipped with the disc drive.

As shown in FIG. 14, an identification indication reading apparatus 100 includes a photo-interrupter 85 which functions as the detection means described above, an analog signal amplifier 101, an A/D converter 103 and a system control section 105. The system control section 105 includes a bar code discriminating section 107 served as bar code discriminating means of the present invention. Further, the system control section 105 carries out control of each section of the identification indication reading apparatus 100 and is connected to a host computer 109.

The analog signal amplifier 101 amplifies analog signals outputted from the photo-interrupter 85. The A/D converter 103 carries out an A/D conversion on the amplified analog signals and sends such converted digital signals to the bar code discriminating section 107 of the system control section 105. The bar code discriminating section 107 carries out a reading of the bar code (as described below) and determines whether or not the bar code was accurately read.

Next, the operation of the identification indication reading apparatus will be explained.

First, the disc tray 5 is ejected out through the opening 15a of the front panel 15 of the disc apparatus 1A and an optical disc 3 is placed on the disc supporting portion 5a of the disc tray 5. Then, after carrying out a prescribed loading operation, the loading motor 61 rotates in a prescribed direction, whereby the operative gear 65 is rotated in the counter-clockwise direction in FIG. 5 (reverse direction) via the speed reduction mechanism. In accordance with such operations, the disc tray 5 is moved backwards (toward the rear of the disc apparatus) through the opening 15a to the disc loaded position as described above. In this way, the optical disc 3 which is placed in the disc supporting portion 5a of the disc tray 5 is also transported to the disc loaded position inside the main body 2.

During the loading operation of the disc tray 5, namely, as the disc tray 5 moves backward, the operative gear 65 meshes with the first rack 6a of the rear surface of the disc tray 5, and the protrusion 59 of the upper portion of the cam member 55 is guided along the first movement restricting groove 7a. Accordingly, the cam member 55 is held at the first position and cannot move toward the second position. As a result, the planetary arm 66 is also held at a prescribed position and cannot rotate. Therefore, in this state, the operative gear 65 rotates at a prescribed position, so that it functions as a drive gear for moving the disc tray 5. Further, in this state, the front portion of the mechanism unit 42 is held at the lowered position.

When the disc tray 5 approaches the disc loaded position, the protrusion 59 formed on the cam member 55 moves from the first movement restricting groove 7a to the second movement restricting groove 7b, thereby causing the cam member 55 to shift slightly in the sideway direction. Then, when the disc tray 5 reaches the disc loaded position, the rear abutment portions 5d, 5e provided on the rear portion of the disc tray 5 abut the wall portion 40b of the chassis 40, thereby further movement of the disc tray 5 is restricted. In this state, the protrusion 59 of the cam member 55 moves toward the third movement restricting groove 7c via the second movement restricting groove 7b, thereby making it possible for the cam member 55 to move from the first position to the second position, and as a result the planetary arm 66 becomes capable of rotation. In this state, the operative gear 65 moves from the first rack 6a to the second rack 6b.

As a result, in this state, because the movement of the disc tray 5 is restricted while the planetary arm 66 is capable of revolution, when the operative gear 65 is rotated by the loading motor 61, the operative gear 65 moves while rotating along the second arc-shaped rack 6b with respect to the axis 64b. Therefore, in this state, the operative gear 65 functions as a planetary gear.

When the operative gear 65 functions as a planetary gear and moves along the second arc-shaped rack 6b, the planetary arm 66 follows the movement of the operative gear 65 and rotates about the revolution axis 64b in the clockwise direction in FIG. 5. When the planetary arm 66 rotates in this way, the second arm 66c of the planetary arm 66 also rotates in the clockwise direction, whereby the cam member 55 moves from the first position to the second position.

In accordance with this movement of the cam member 55, the guide pins 43a, 43b of the tip of the base frame 43 of the mechanism unit 42 are pushed upward to the upper grooves 581 along the slanting grooves 582 of the cam grooves 58a, 58b. In accordance with this, the mechanism unit 42 is displaced from the lowered position to the raised position, whereby the central hub 46a of the turntable 46 engages with the center hole 3a of the optical disc 3 supported on the disc tray 5 which has been transported to the disc loaded position. Then, as the disc clamper 80 is attracted to the permanent magnet 46b of the turntable 46, the optical disc 3 is held therebetween.

In this state, when a playback switch or the like is operated, the spindle motor 45 and the turntable 46 rotate, whereby the optical disc 3 is rotated. When the optical disc 3 begins to rotate, first the reading of the bar code 3d is carried out. Namely, light emitted from the light-emitting element of the photo-interrupter 85 is projected onto the bar code area 3c of the optical disc 3 rotating in the clockwise direction (as shown by the arrow A in FIG. 1) and a scan of the bar code 3d is carried out. The light emitted by the light-emitting element of the photo-interrupter 85 is reflected by the bar code area 3c, and then such light signals are received by the light-receiving element of the photo-interrupter 85 and then converted into analog electrical signals.

As shown in FIG. 14, these analog electrical signals are amplified by the analog signal amplifier 101. Then, the amplified analog signals are A/D converted into binary digital signals by the A/D converter 103. For example, the digital signals having wave shapes as shown in FIG. 3B is produced, in which the signal of the bar 3g is converted to a "1" and the signal of the space 3f is converted to a "0". These digital signals are sent to the bar code discriminating section 107 of the system control section 105, and in the bar code discriminating section 107 a discrimination of the readout data is carried out.

Figure 15:
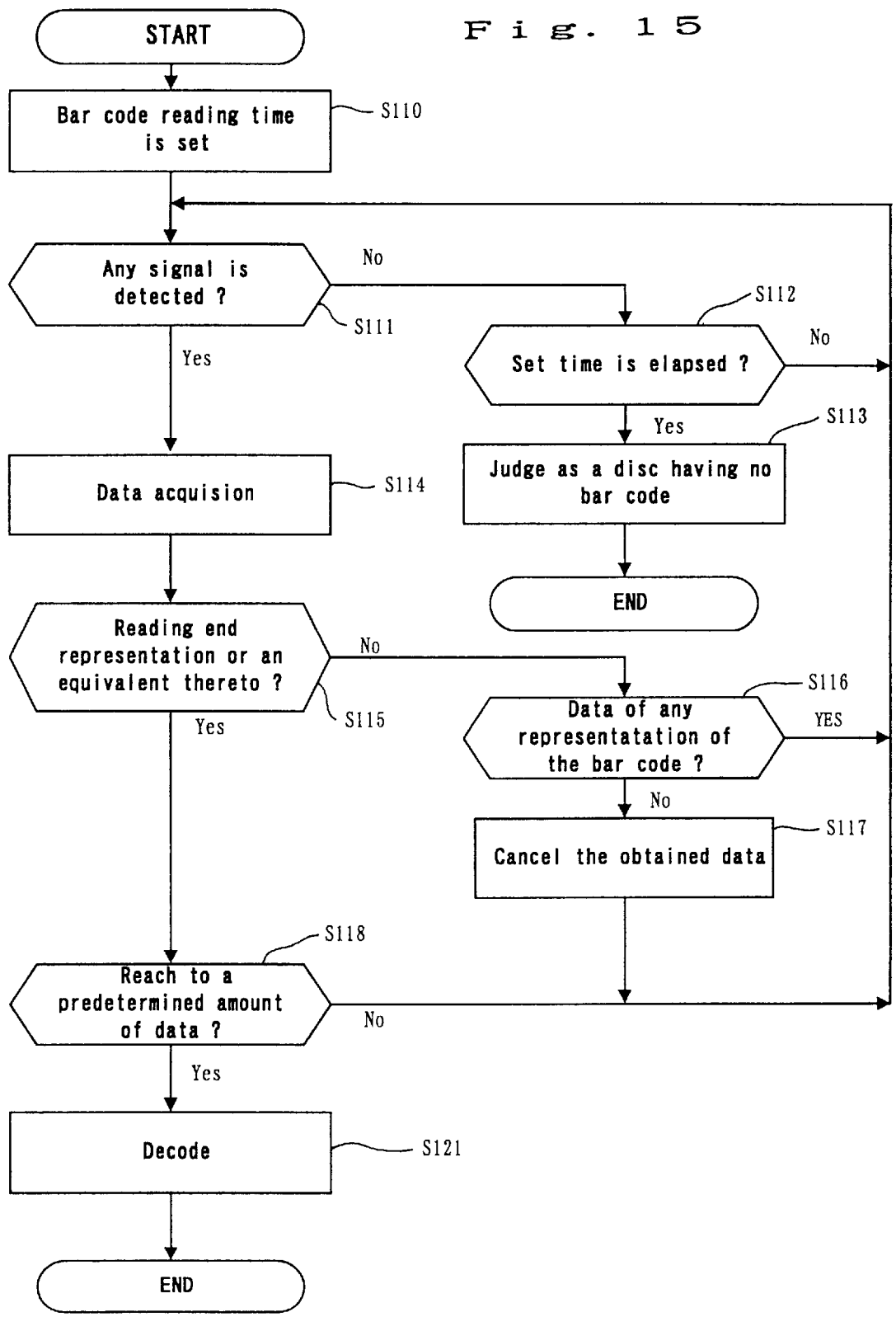
FIG. 15 is a flow chart which shows one embodiment of the bar code reading process of the identification indication reading apparatus according to the present invention.

Next, with reference to FIG. 15, a description of the process of discriminating the bar code will be given.

First, at Step 110 (hereinbelow, "Step" will be abbreviated by "S"), the timer is set, namely, the bar code reading time (hereafter referred to as "the set time") is set.

Next, at S111, a determination of whether or not the photo-interrupter 85 has obtained any data is carried out, namely, a determination of whether or not any signals from the photo-interrupter 85 have been inputted to the bar code discriminating section 107 is carried out. In S111, if it is determined that no signals have been inputted to the bar code discriminating section 107, the process proceeds to S112.

At S112, a determination is made as to whether or not the set time has elapsed. In S112, if it is determined that the time lies within the set time, the process returns to S111. Accordingly, when the time lies within the set time, this process (routine) is repeated until a signal input is detected. On the other hand, in S112, if it is determined that the set time has elapsed, namely, in the case where no signal is inputted to the bar code discriminating section 107 within the set time, the optical disc is judged to be a disc with no bar code (S113) and the bar code reading process is terminated.

On the other hand, if some signal is inputted to the bar code discriminating section 107 at S111, a data acquisition is first carried out (S114) based on the inputted signal. At S115 a determination is made as to whether or not the data obtained in S114 is data of a bar code reading end representation (start code) or a representation which is equivalent to the reading end indication. This is because there is a case that a representation which is the same as that of the reading end representation (a combination of the bars and spaces described above) is contained in an intermediate portion of the bar code.

At S115, if the data obtained at S114 is not data of a reading end representation or a representation equivalent to the reading end representation, the process proceeds to S116 and a determination is made as to whether or not the obtained data is data of any representation constituting the bar code. Specifically, a determination is made as to whether or not the obtained data matches bar code standards, namely, whether or not the obtained data matches the width of bars and spaces that make up the bar code. In the case where it is determined that the obtained data is not the data of any representation of the bar code, the obtained data is judged to include noise in addition to bar code data, whereupon the obtained data is completely canceled (S117) and the process returns to S111 to carry out new data acquisition.

On the other hand, in the case where it is determined at S116 that the obtained data is data of any representation constituting the bar code, it is judged that the reading end indication has not been detected yet at that time, namely, the data obtained in S114 is judged to contain data up to an intermediate portion of the bar code, and then while keeping the data obtained thus far, the process once again returns to S111 and data acquisition is continued.

On the other hand, if it is determined at S115 that the data obtained at S114 is that of the reading end representation or an equivalent thereto, the process proceeds to S118 and a determination is carried out as to whether or not the obtained data reaches a predetermined amount of data of the bar code. The reason why this determination is carried out is because even if a bar code reading end representation is detected, there is a case that all the bar code data has not been read out. For example, depending on the positional relationship between the bar code 3d and the photo-interrupter 85 at the beginning of the reading of the bar code 3d, there is a case where such reading begins at an intermediate portion of the bar code 3d. In such a case, data for the beginning portion of the bar code 3d has not been obtained even when the reading end representation is detected. Further, as mentioned above, there is a case that a representation which is equivalent to the reading end representation is included in an intermediate portion of the bar code, and in the case where the reading has only been carried out to such a representation which is equivalent to the reading end representation, even if the bar code is read from the beginning, data for the portion of the bar code after such equivalent representation will not be acquired.

If it is determined at S118 that the obtained data does not reach the predetermined amount of the bar code data, the data obtained up to that point is kept while the process returns to S111 to continue data acquisition.

On the other hand, if it is determined at S118 that the obtained data reaches the predetermined amount of the bar code data, it means that the bar code data has been completely read out, and as a result the process proceeds to S121, and the obtained data is decoded in accordance with a prescribed decoding routine. In this case, if it is required to do so, the reading start representation 3h and the reading end representation 3i may be deleted.

As described above, in the identification indication reading apparatus of the present embodiment, no specific position is required for beginning bar code data acquisition, instead such position changes depending on the positional relationship between the photo-interrupter 85 and the bar code at the time when reading is begun. Accordingly, in this identification indication reading apparatus, when a bar code reading operation is to begun, first data acquisition is begun regardless the relative position between the photo-interrupter 85 and the bar code, and if there is a signal input then a determination is made as to whether or not such signal is that of the reading end representation or an equivalent to the reading end representation, and if this is the case then a determination as to whether or not the obtained data reaches a predetermined amount of the bar code data is carried out, and if this is the case then a determination as to whether or not the obtained data is data resulted from the bar code (i.e., whether or not the obtained data matches the standard bar and space widths of a bar code). In this way, data acquisition is continued until all the necessary conditions are satisfied in order to perform an accurate reading of the bar code. On the other hand, if noise is detected other than the representations of the bar code, all the data acquired up to that point is canceled and a new data acquisition is begun. In this way, the bar code reading is carried out.

Then, based on the bar code data read out as described above, a prescribed software can be run to find out information such as the type of disc and format as well as the manufacturer thereof and the place and date of manufacturing. In this way, once the type of disc has been identified, playback of the optical disc 3 is begun, with the data recorded in the program area 3e being read out in accordance with the format thereof.

In the identification indication reading apparatus described above, when the bar code is being read out, even in the case where there is a noise due to letters, symbols, patterns or scratches and dust on the optical disc, it is possible to distinguish between bar code signals and signals resulted from such noise, and this makes it possible to accurately read the bar code provided on the optical disc.

Further, even in the case where the reading of the bar code begins on an intermediate portion of the bar code due to the positional relationship between the bar code and the photo-interrupter when the bar code reading is begun, it is possible to accurately read the bar code, whereby it becomes possible to read the bar code without having to waste the data which is initially obtained. Furthermore, it is easy to determine whether or not the disc is provided with a bar code.

Figure 16:
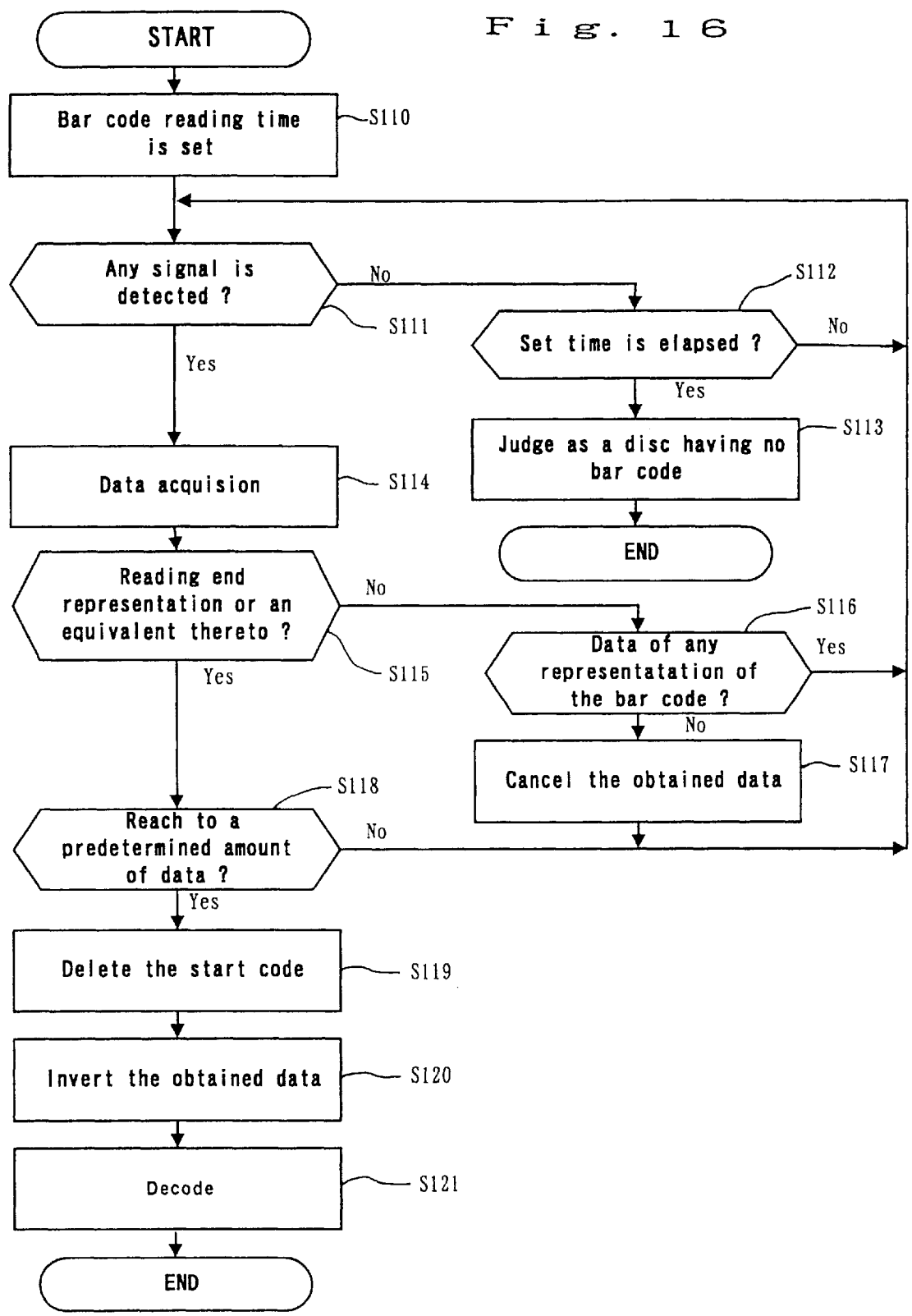
FIG. 16 is a flow chart which shows another embodiment of the bar code reading process of the identification indication reading apparatus according to the present invention.

Next, a description of a second embodiment will be given with reference to FIG. 16. This embodiment is adapted for optical discs having a reverse ordered bar code, such as the photo CD described above. In this connection, because the signal processing is the same from Start to S118, a description of those steps for this embodiment will be omitted.

In the case of an optical disc having the reversed order bar code, such as the photo CD described above, it is necessary to output the obtained data after it is inverted. Therefore, in this embodiment, first data for the reading end representation (start code) must be deleted from the obtained data (S119). Next, the bar code data from the end portion to just before the stop code is converted in this order (S120). At this point, data for the reading start representation 3h (stop code) is not converted. In this way, bar code data without the start code and the stop code is obtained. Then, this obtained bar code data is decode in accordance with a prescribed decoding routine (S121).

Accordingly, in the second embodiment of the identification indication reading apparatus, even if the reading of the bar code is begun from the end position, it is possible to accurately read the bar code.

In particular, the first embodiment is applicable to other CDs provided with a bar code.

Figure 17:
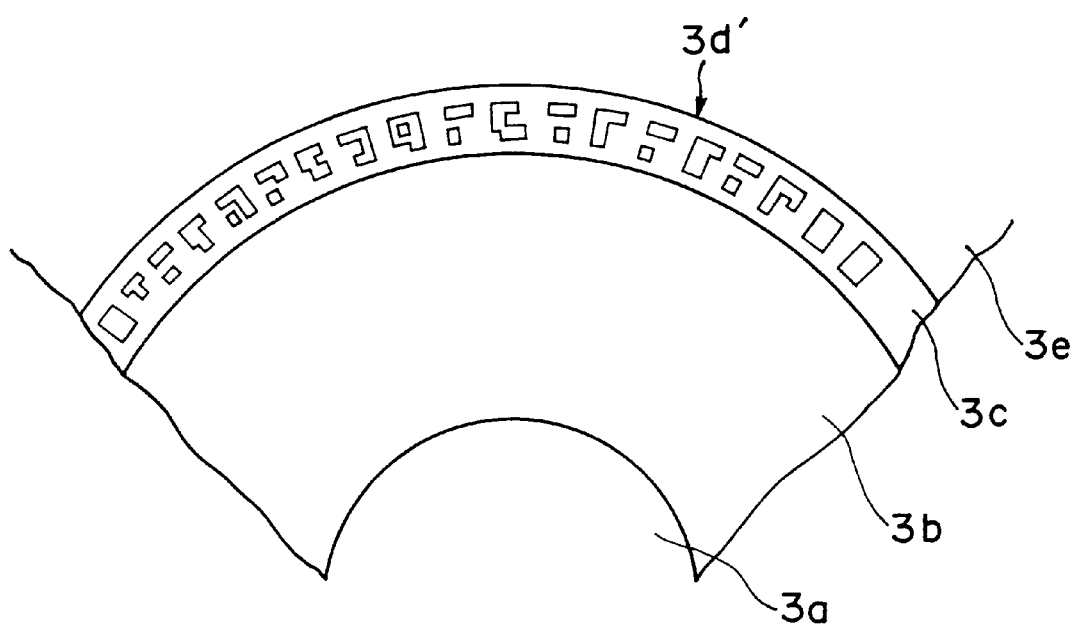
FIG. 17 is an enlarged view of a part of an optical disc to which a two-dimensional data symbol is attached.

Furthermore, even though the above embodiments were described for an optical disc provided with a bar code as an identification indication, the present invention is also suitable for identification indications other than a bar code, such as the two-dimensional data symbols 3d' provided on the disc shown in FIG. 17. Moreover, it is also possible to use the apparatus of the present invention with discs provided with letters, characters and the like in combination with such bar code or two-dimensional data symbols.

Moreover, even though in the above embodiments descriptions are made with reference to the photo-interrupter which is provided on the support portion 81 of the disc clamper 80 to read the bar code from above the optical disc, the present invention is not limited to such arrangement of the photo-interrupter.

Figure 18:
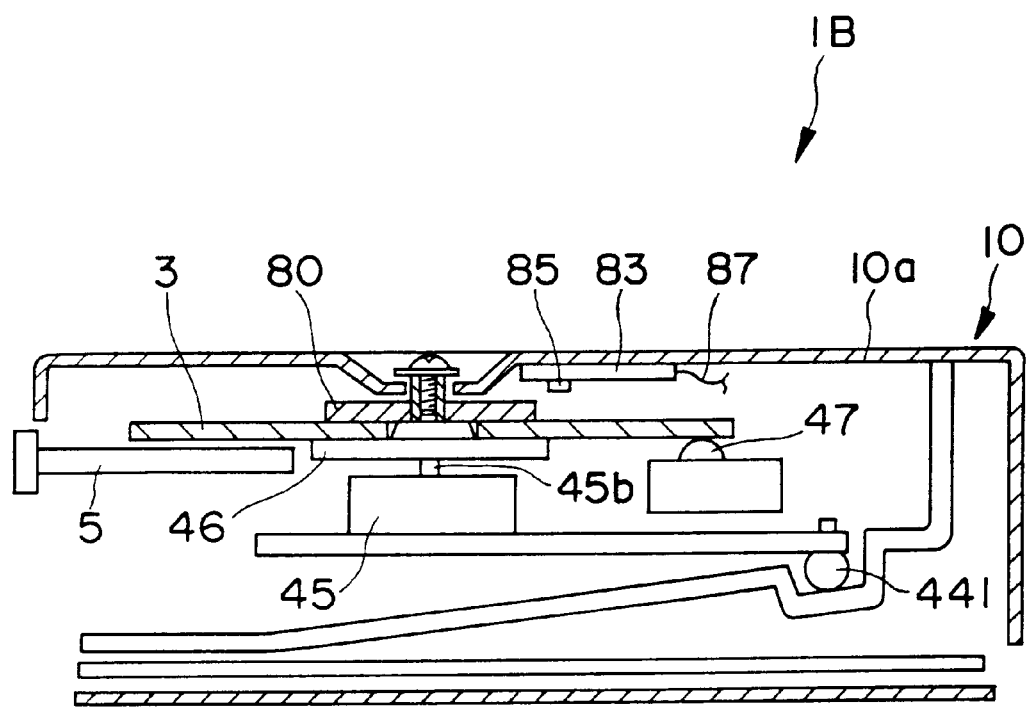
FIG. 18 is a cross-sectional view which shows the state where an optical disc is loaded and the bar code thereof is read by another type of bar code reader of the disc drive.

For example, as shown in FIG. 18, in an identification indication apparatus which does not include a support member for supporting the disc clamper 80, the disc clamper 80 is provided on the underside surface of a top plate 10a of a casing 10 so as to be capable of rotation around the same axis as the turntable 45. Furthermore, a circuit substrate 83 for mounting the photo-interrupter 85 is arranged near the disc clamper 80 provided on the underside surface of the top plate 10a of the casing 10. This circuit substrate 83 is arranged so as to position the photo-interrupter 85 above the bar code area 3c when the optical disc is positioned in the loaded position. Accordingly, the photo-interrupter 85 is positioned on the opposite side of the loaded optical disc 3 relative to the optical pick-up 47.

In this way, even if the photo-interrupter 85 is provided on the underside surface of the top plate 10a of the casing 10, it is possible to carry out a bar code reading in accordance with the steps described above.

Figure 2:
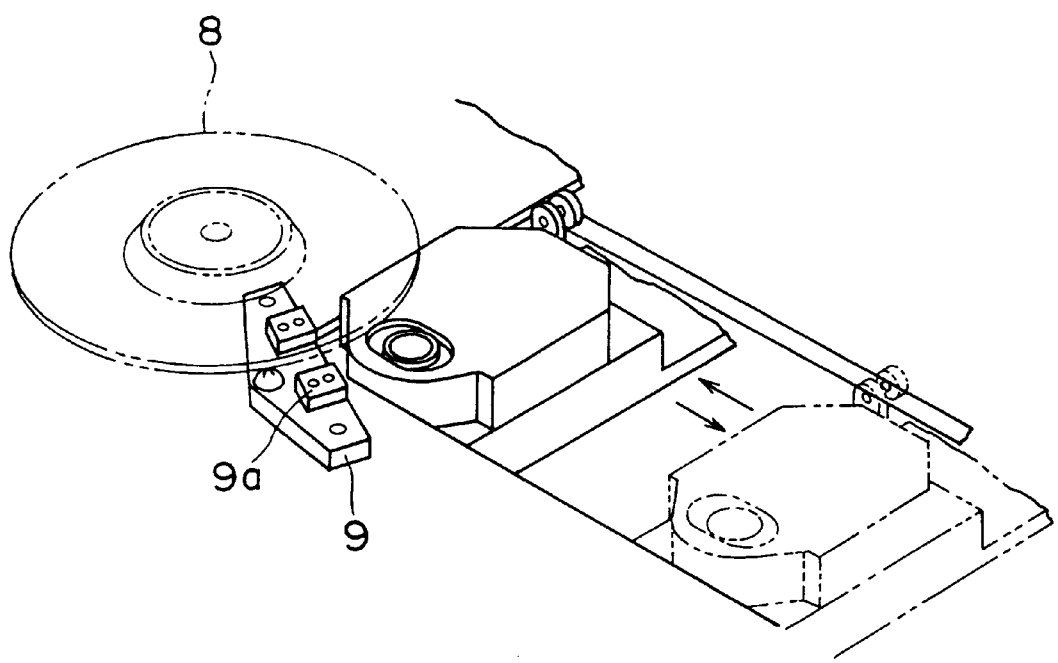
FIG. 2, is a perspective view which shows a mounting position of a photo-interrupter of a conventional disc drive.

Furthermore, as shown in FIG. 2, it is also possible to mount a photo-interrupter on the side where the optical pick-up is provided in order to read the bar code from the underside of the loaded optical disc. In this way, even if the bar code is read from the underside of the optical disc, the reading order of the bar code is the same as that for the case in which the bar code is read from above, and therefore it is not necessary to perform different signal processing. Accordingly, in such arrangement it is possible to use the same bar code reading process described above.

Furthermore, it should be noted that the disc drive used in the identification indication reading apparatus of the present invention is not limited to the disc drive described in the embodiments above.

Finally, it is to be understood that many changes and additions may be made to the embodiments described above without departing from the scope and spirit of the invention as defined in the appended claims.

What is claimed is:

1. An apparatus for reading an identification indication provided on an optical disk, the identification indication being provided in at least a part of an annular-shaped identification indication area formed between a program area and a clamping area of the optical disc, and the identification indication being formed with arrangement of a plurality of representations carrying predetermined information and having a reading end representation at the rear portion of the representations in the rotational direction of the optical disc, the apparatus comprising:

detecting means for optically acquiring the information of the identification indication of the optical disc; and discriminating means for discriminating based on an output from the detecting means as to whether or not the identification indication is accurately read;

wherein said discriminating means including a first determining means for determining based on the output from the detecting means as to whether the data acquired by the detecting means contains data of the reading end representation; and a second determining means for determining based on the result of the determination of the first determining means as to whether or not the data acquired by the detecting means reaches a predetermined amount of data of the identification indication.

2. The apparatus as claimed in claim 1, wherein the discriminating means discriminates that the identification indication is accurately read in the case where the first determining means determines that the data acquired by the detecting means contains data of the reading end representation or an equivalent thereof, and the second determining means determines that the data acquired by the detecting means reaches the predetermined amount of data of the identification indication.

3. The apparatus as claimed in claim 1, wherein the discriminating means discriminates that the data acquired by the detecting means is not data of the reading end representation in the case where the first determining means determines that the data acquired by the detecting means contains data of the reading end representation or an equivalent thereof but the second determining means determines that the data acquired by the detecting means does not reach the predetermined amount of data of the identification indication, and then the apparatus continues the data acquisition for the identification indication through the detecting means.

4. The apparatus as claimed in claim 1, wherein the discriminating means further includes a third determining means for determining as to whether or not the data acquired by the detecting means is data of a predetermined representation in the identification indication in the case where the first determining means determines that the data acquired by the detecting means does not contain any data of the reading end representation nor an equivalent thereof, wherein the discriminating means discriminates that the detecting means is in the process of reading the identification indication in the case where the third determining means determines that the data acquired by the detecting means is data of the predetermined representation in the identification indication, and in such a case the apparatus continues the data acquisition through the detecting means; or the discriminating means discriminates that the data acquired by the detecting means is a noise other than the identification indication in the case where the third determining means determines that the data acquired by the detecting means is not data of the predetermined representation in the identification indication, and in such a case the apparatus discards the acquired data and then restarts the data acquisition through the detecting means.

5. The apparatus as claimed in claim 1, wherein said discriminating means further includes a fourth determining means for determining, before the determination of the first determining means being carried out, as to whether or not the detecting means acquires any data within a predetermined time;

wherein the discriminating means discriminates that the optical disc is one which does not have the identification indication in the case where the fourth determining means determines that the detecting means does not acquire any data within the predetermined time.

6. The apparatus as claimed in claim 1, wherein the identification indication includes a bar code provided in the identification indication area of the optical disc in an arch-shaped manner.

7. The apparatus as claimed in claim 6, wherein the bar code is arranged in such an order as to be read from the rear side of the rotational direction of the optical disc toward the front side thereof, in which the apparatus further comprising means for inverting the acquired data and then outputting the inverted data.

8. The apparatus as claimed in claim 1, wherein the identification indication includes a two-dimensional data symbol provided in the identification indication area of the optical disc in an arch-shaped manner.

9. The apparatus as claimed in claim 1, wherein the optical disc has an underside surface in which signals are recorded and a top surface opposite thereto, wherein the identification indication is provided on the optical disc such that it is optically readable from either of the side of the underside surface or the top surface of the optical disc.

10. The apparatus as claimed in claim 1, wherein the optical disc has an underside surface in which signals are recorded and a top surface opposite thereto, in which the identification indication is provided on the optical disc such that it is optically readable from either of side of the underside surface or the top surface of the optical disc, wherein the detecting means acquires the information carried by the identification indication from the side of the top surface of the optical disc.

11. A method for optically reading an identification indication provided on an optical disk, the identification indication being provided in a part of an annular shaped identification indication area formed between a program area and a clamping area of the optical disc, and the identification indication being formed with arrangement of a plurality of representations carrying predetermined information and having a reading end representation at the rear portion of the representations in the rotational direction of the optical disc, the method comprising:

detecting step for optically acquiring the information of the identification indication of the optical disc;

first step for determining based on the data acquired in the detecting step as to whether the data acquired in the detecting step contains data of the reading end representation; and a second step for determining based on the result of the determination in the first step as to whether or not the data acquired in the detecting step reaches a predetermined amount of data of the identification indication.

12. The method as claimed in claim 11, wherein it is discriminated that the identification indication is accurately read when it is determined in the first determining step that the data acquired in the detecting step contains data of the reading end representation or an equivalent thereof, and it is determined in the second determining step that the data acquired in the detecting step reaches the predetermined amount of data of the identification indication.

13. The method as claimed in claim 11, wherein it is determined that the data determined in the first determining step is not data of the reading end representation nor an equivalent thereof when it is determined in the first determining step that the data acquired in the detecting step contains data of the reading end representation or an equivalent thereof but it is determined in the second step that the data acquired in the detecting step does not reach the predetermined amount of data of the identification indication, and in such a case returning to the detecting step to continue the data acquisition for the identification indication.

14. The method as claimed in claim 11, further comprising a third step for determining as to whether or not the data acquired in the detecting step is data of a predetermined representation in the identification indication when it is determined in the first determining step that the data acquired in the detecting step does not contain data of the reading end representation nor an equivalent thereof, wherein it is determined that the identification indication is still being read when it is determined in the third determining step that the data acquired in the detecting step is data of the predetermined representation in the identification indication, and then returning to the detecting step to continue the data acquisition; or it is determined that the data acquired in the detecting step is a noise other than the identification indication when it is determined in the third determining step that the data acquired in the detecting step is not data of the predetermined representation in the identification indication, and then discarding the acquired data and then returning to the detecting step to restart the data acquisition.

15. The method as claimed in claim 12, further comprising a fourth step for determining, before the determination in the first determining step is made, as to whether or not any data is acquired within a predetermined time in the detecting step;

wherein it is determined that the optical disc is one which does not have the identification indication when it is determined in the fourth determining step that any data is not acquired within the predetermined time in the detecting step.

16. The method as claimed in claim 11, wherein the identification indication includes a bar code provided in the identification indication area of the optical disc in an arch-shaped manner.

17. The method as claimed in claim 16, wherein the bar code is arranged in such an order as to be read from the rear side of the rotational direction of the optical disc toward the front side thereof, in which the method further comprising a step for inverting the acquired data and then outputting the inverted data.

18. The method as claimed in claim 11, wherein the optical disc has an underside surface in which signals are recorded and a top surface opposite thereto, in which the identification indication is provided on the optical disc such that it is optically readable in the detecting step from either of the side of the underside surface or top surface of the optical disc.

* * * * *